(12) United States Patent
Fujii et al.

(10) Patent No.: US 7,610,746 B2
(45) Date of Patent: Nov. 3, 2009

(54) COMBUSTION CONTROL DEVICE FOR GAS TURBINE

(75) Inventors: Kentaro Fujii, Takasago (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 667 days.

(21) Appl. No.: 11/360,990

(22) Filed: Feb. 24, 2006

(65) Prior Publication Data

US 2007/0089395 A1    Apr. 26, 2007

(30) Foreign Application Priority Data

Sep. 14, 2005    (JP)    ............... 2005-266356

(51) Int. Cl.
*F02C 3/22*    (2006.01)
*F02C 9/26*    (2006.01)

(52) U.S. Cl. .................... 60/39.281; 60/39.465; 60/746

(58) Field of Classification Search ............. 60/39.281, 60/39.465, 734, 746, 747
See application file for complete search history.

(56) References Cited

U.S. PATENT DOCUMENTS

| | | | | |
|---|---|---|---|---|
| 4,716,719 | A * | 1/1988 | Takahashi et al. | ............. 60/773 |
| 7,047,747 | B2 * | 5/2006 | Tanaka | ............. 60/773 |
| 7,481,061 | B2 * | 1/2009 | Gadde et al. | ............. 60/778 |

FOREIGN PATENT DOCUMENTS

| | | |
|---|---|---|
| JP | 58079628 A | 5/1983 |
| JP | 01285627 A | 11/1989 |
| JP | 06-147484 | 5/1994 |
| JP | 08-178290 | 7/1996 |
| JP | 8312377 A | 11/1996 |
| JP | 11-022490 | 1/1999 |
| JP | 11132535 A | 5/1999 |
| JP | 11229903 A | 8/1999 |
| JP | 2005036691 A | 2/2005 |

* cited by examiner

*Primary Examiner*—Louis J Casaregola
(74) *Attorney, Agent, or Firm*—Westerman, Hattori, Daniels & Adrian, LLP

(57) ABSTRACT

A combustion control device for a gas turbine is capable of determining respective fuel flow rate control valve position command values based on fuel ratios. The combustion control device for a gas turbine is configured to calculate fuel flow rate command values for respective types of fuel gas based on a total fuel flow rate command value and fuel gas ratios, to calculate fuel gas flow rates based on the fuel flow rate command values and on a function of the fuel flow rate command value and the fuel gas flow rate, to calculate Cv values of the respective fuel flow rate control valves in accordance with a Cv value calculation formula based on the fuel gas flow rates, a fuel gas temperature, and front and back pressures of the respective fuel flow rate control valves, and to calculate respective fuel flow rate control valve position command values based on the Cv values and on a function between the Cv value and apertures of the fuel flow rate control valves.

7 Claims, 28 Drawing Sheets

IGV OPENING OPERATION AT CONSTANT POWER GENERATOR OUTPUT

IGV OPENING OPERATION AT CONSTANT POWER GENERATOR OUTPUT

IGV OPENING OPERATION AT CONSTANT POWER GENERATOR OUTPUT

COMBUSTION CONTROL DEVICE FOR GAS TURBINE

BACKGROUND OF THE INVENTION

1. Field of the Invention

The present invention relates to a combustion control device for a gas turbine.

2. Background Art

A gas turbine typically includes a gas turbine body, a combustor, a compressor provided with inlet guide vanes (IGVs), and fuel flow rate control valves for controlling fuel supplies to fuel nozzles of the combustor. Such a gas turbine further includes a combustion control device for the gas turbine which is configured to control the fuel supplies to the fuel nozzles by controlling apertures of the fuel flow rate control valves, and an IGV control device configured to control apertures of the IGVs.

Moreover, the combustor may include one provided with multiple types of fuel nozzles, one provided with a main nozzle for premixed combustion and a pilot nozzle for diffuse combustion in order to reduce NOx at the time of high-load combustion and to achieve combustion stability at the time of low-load combustion, and one further provided with a top hat nozzle for premixed combustion in order to enhance NOx reduction and the like.

FIG. 39 is a block diagram showing an outline of a process flow in terms of a conventional gas turbine combustion control device. As shown in FIG. 39, the conventional gas turbine combustion control device is configured to set up a valve position command value (CSO) in the first place based on a power generator output command value transmitted from a central load dispatching center for managing power generator outputs in terms of multiple power generation facilities. Then, a pilot fuel flow rate control valve position command value (PLCSO), a top hat fuel flow rate (THCSO), and a main fuel flow rate control valve position command value (MACSO) are calculated based on this CSO, a function FX1 of the CSO and the PLCSO set up to obtain a given pilot ratio, a function FX2 of the CSO and the THCSO set up to obtain a given top hat ratio, and a calculation formula (MACSO=CSO−PLCSO−THCSO) for finding the MACSO. A fuel supply to the main nozzle, a fuel supply to the pilot nozzle, and a fuel supply to the top hat nozzle are controlled by regulating an aperture of a main fuel flow rate control valve, an aperture of a pilot flow rate control valve, and an aperture of a top hat control valve respectively based on these valve position command values, and thereby controlling the power generator output to match the power generator output command value. If an actual measurement value of the power generator output does not match the power generator output command value in this case, the gas turbine combustion control device adjusts the CSO based on deviations of these factors so as to achieve matching.

Meanwhile, when the gas turbine includes a combustor bypass valve for adjusting a bypass amount of compressed air to the combustor, the conventional combustion control device for the gas turbine calculates a combustor bypass valve position command value (BYCSO) based on a function (BYCSO=FX(MW/Pcs)) of a ratio (MW/FX(Pcs)) between a power generator output (a gas turbine output) MW and a function FX(Pcs) of a cylinder pressure Pcs and the BYCSO, as well as on a ratio (MW/FX(Pcs)) between an actual measurement value of the power generator output (the gas turbine output) MW and the function FX(Pcs) of an actual measurement value of the cylinder pressure Pcs as shown in FIG. 40. The bypass amount of the compressed air has been regulated by controlling an aperture of the combustor bypass valve based on this BYCSO. That is, in this case, a state of combustion of the gas turbine is regulated by performing the above-mentioned two control operations (i.e. the fuel flow rate control valve position control and the combustor bypass valve position control).

Of the following prior art documents, Patent Publication 1 discloses a pilot ratio automatic control device, Patent Publication 2 discloses a gas turbine fuel supply device, and Patent Publication 3 discloses a combustion control device, respectively.

(Patent Document 1) Japanese Unexamined Patent Publication No. 11(1999)-22490

(Patent Document 2) Japanese Unexamined Patent Publication No. 8(1996)-178290

(Patent Document 3) Japanese Unexamined Patent Publication No. 6(1994)-147484

The above-described conventional gas turbine combustion control device calculates the valve position command values (PLCSO, THCSO, and MACSO) of the respective fuel flow rate control valves directly by use of the CSO (the valve position command value). Specifically, the pilot ratio, the top hat ratio, and so forth are controlled as the functions of the CSO (the valve position command value). For this reason, the conventional gas turbine combustion control device has the following problems.

1. It is difficult to link the valve position command values (PLCSO, THCSO, and MACSO) of the respective fuel flow rate control valves with respective fuel gas ratios (the pilot ratio, the top hat ratio, and a main ratio). Moreover, relations of these factors are deviated in certain conditions.

2. When an intake-air temperature (an atmospheric temperature) changes in an operating state of a constant combustion gas temperature at an inlet of the gas turbine, such a change causes a variation in density of the intake gas and a change in the CSO, whereby the pilot ratio, the top hat ratio, and the main ratio are deviated. If the intake-air temperature changes as shown in an example of a relation between the combustion gas temperature TIT and the CSO relative to the variation in the intake-gas temperature in FIG. 41, the relation between the combustion gas temperature TIT and the CSO is deviated. Moreover, when the CSO is deviated, the PLCSO, the THCSO and the like are also deviated. As a consequence, the pilot ratio, the top hat ratio, and the like are deviated.

3. When a fuel gas temperature changes in the operating state at the constant gas temperature at the inlet of the gas turbine, such a change causes a variation in density of the fuel gas and a change in the CSO, whereby the pilot ratio, the top hat ratio, and the main ratio are deviated. If the fuel gas temperature changes as shown in an example of a relation between the combustion gas temperature TIT and the CSO relative to the variation in the fuel gas temperature in FIG. 42, the relation between the combustion gas temperature TIT and the CSO is deviated. Moreover, when the CSO is deviated, the PLCSO, the THCSO and the like are also deviated. As a consequence, the pilot ratio, the top hat ratio, and the like are also deviated.

4. When the performance of the gas turbine is deteriorated due to a drop in a capability of the compressor or the like in an operating state at a constant combustion gas temperature, such deterioration causes a variation in the CSO, whereby the pilot ratio, the top hat ratio, and the main ratio are deviated.

5. When the quality of the fuel gas (a calorific value of the fuel gas) changes in the operating state at the constant combustion gas temperature, such a change causes the variation in the CSO, whereby the pilot ratio, the top hat ratio, and the like are also deviated. If the calorific value of the fuel gas changes as shown in an example of a relation between the gas turbine output (the power generator output) and the CSO relative to the variation in the calorific value of the fuel gas temperature in FIG. 43, the relation between the gas turbine output (the power generator output) and the CSO is deviated. Moreover, when the CSO is deviated, the PLCSO, the THCSO and the like are also deviated. As a consequence, the pilot ratio, the top hat ratio, and the like are also deviated.

That is, the conventional gas turbine combustion control device is not configured to determine the valve position command values (PLCSO, THCSO, and MACSO) of the respective fuel flow rate control valves based on the respective fuel gas ratios (the pilot ratio, the top hat ratio, and the main ratio). Accordingly, it is difficult to link the valve position command values (PLCSO, THCSO, and MACSO) of the respective fuel flow rate control valves with the respective fuel gas ratios (the pilot ratio, the top hat ratio, and the main ratio). Moreover, the relations of these factors are deviated depending on the conditions.

SUMMARY OF THE INVENTION

The present invention has been made in consideration of the foregoing problems. An object of the present invention is to provide a combustion control device for a gas turbine capable of determining valve position command values of respective fuel flow rate control valves (including a pilot fuel flow rate control valve position command value, a top hat fuel flow rate control value position command value, and a main fuel flow rate control value position command value, for example) based on fuel gas ratios (including a pilot ratio, a top hat ratio, and a main ratio, for example).

To attain the object, a first aspect of the present invention provides a combustion control device for a gas turbine which is fitted to a gas turbine provided with a gas turbine body, a combustor having multiple types of fuel nozzles, a compressor, and multiple fuel flow rate control valves for respectively controlling fuel supplies to the multiple types of the fuel nozzles, and is configured to control the fuel supplies to the multiple types of the fuel nozzles by controlling apertures of the fuel flow rate control valves. Here, the combustion control device includes fuel flow rate command setting means for calculating fuel flow rate command values proportional to fuel flow rates to be supplied respectively to the multiple types of the fuel nozzles based on a total fuel flow rate command value proportional to a total fuel flow rate to be supplied to the multiple types of the fuel nozzles and on ratios of fuels to be supplied respectively to the multiple types of the fuel nozzles, fuel flow rate setting means for calculating the fuel flow rates to be supplied respectively to the multiple types of the fuel nozzles based on the fuel flow rate command values set up by the fuel flow rate command setting means and on a function of the fuel flow rate command values and the fuel flow rates, Cv value setting means for calculating Cv values of the fuel flow rate control valves in accordance with a Cv value formula based on the fuel flow rates set up by the fuel flow rate setting means, a fuel temperature, and front pressures and back pressures of the fuel flow rate control valves, and fuel flow rate control valve position command setting means for calculating fuel flow rate control valve position command values based on the Cv values set up by the Cv value setting means and on a function of the Cv values and fuel flow rate control valve positions. Here, the fuel supplies to the multiple types of the fuel nozzles are controlled by controlling apertures of the fuel flow rate control valves based on the fuel flow rate control valve position command values set up by the fuel flow rate control valve position command setting means.

Meanwhile, a second aspect of the present invention provides the combustion control device for a gas turbine according to the first aspect, which further includes intake-air temperature correcting means for correcting the ratios of the fuels based on an intake-air temperature.

Meanwhile, a third aspect of the present invention provides the combustion control device for a gas turbine according to the second aspect, in which the intake-air temperature correcting means adjusts an amount of intake-air correction in response to a gas turbine output.

Meanwhile, a fourth aspect of the present invention provides the combustion control device for a gas turbine according to any one of the first, second, and third aspects, which further includes fuel temperature correcting means for using a measurement value of the fuel temperature at a certain time period prior to occurrence of an anomaly of a fuel thermometer for measuring the fuel temperature as the fuel temperature in the event of the anomaly.

Meanwhile, a fifth aspect of the present invention provides the combustion control device for a gas turbine according to the fourth aspect, in which the fuel temperature correcting means includes a first primary delay operator and a second primary delay operator including a smaller primary delay time constant than a primary delay time constant of the first primary delay operator. Here, primary delay calculations are performed by use of the first primary delay operator and the second primary delay operator in terms of the fuel temperature, and a smaller value of calculation results is used as the fuel temperature.

Meanwhile, a sixth aspect of the present invention provides the combustion control device for a gas turbine according to any one of the first, second, third, fourth, and fifth aspects, which further includes pressure computing means for computing a back pressure of the fuel flow rate control valve corresponding to a front pressure of the fuel nozzle by use of a formula for computation of the front pressure of the fuel nozzle based on the fuel flow rate of the fuel nozzle derived from the fuel flow rate set up by the fuel flow rate setting means, the Cv value of the fuel nozzle, the fuel temperature, and a back pressure of the fuel nozzle, and pressure correcting means for using the pressure computed by the pressure computing means as the back pressure of the fuel flow rate control valve upon occurrence of an anomaly of a pressure gauge for measuring the back pressure of the fuel flow rate control valve.

Meanwhile, a seventh aspect of the present invention provides the combustion control device for a gas turbine according to the sixth aspect, which includes learning means for comparing the back pressure of the fuel flow rate control valve computed by the pressure computing means with an actual measurement value of the back pressure of the fuel flow rate control valve and correcting the Cv value of the fuel nozzle such that the computed value of the back pressure coincides with the actual measurement value of the back pressure.

Here, when setting the fuel flow rate control valve position command values based on the ratios of the fuels (including a pilot ratio, a top hat ratio, and a main ratio, for example) as defined in the first aspect of the invention, it is possible to use the ratios of the fuels which are set up by arbitrary means. For example, it is possible to determine the ratios of the fuels based on a combustions gas temperature at an inlet of a gas turbine calculated by appropriate computing means or on a value proportional thereto. For instance, the following configurations are applicable in this case.

Specifically, a first configuration provides a combustion control device which is fitted to a gas turbine provided with a gas turbine body, a combustor having multiple types of fuel nozzles, a compressor having an inlet guide vane, and multiple fuel flow rate control valves for respectively controlling fuel supplies to the multiple types of the fuel nozzles, and is configured to control the fuel supplies to the multiple types of the fuel nozzles by controlling apertures of the fuel flow rate control valves. Here, the combustion control device includes first gas turbine output computing means for computing a first gas turbine output corresponding to a first combustion gas temperature at an inlet of the gas turbine based on an intake-air temperature of the compressor and an aperture of the inlet guide vane, second gas turbine output computing means for computing a second gas turbine output corresponding to a second combustion gas temperature at the inlet of the gas turbine higher than the first combustion gas temperature at the inlet of the gas turbine based on the intake-air temperature of the compressor and the aperture of the inlet guide vane, and combustion load command computing means for computing a combustion load command value to render the combustion gas temperature at the inlet of the gas turbine dimensionless by direct interpolation based on the first gas turbine output computed by the first gas turbine output computing means, the second gas turbine output computed by the second gas turbine output computing means, and an output of the gas turbine. Here, ratios of fuels to be supplied respectively to the multiple types of the fuel nozzles are determined based on the combustion load command value computed by the combustion load command computing means, and the fuel supplies to the multiple types of the fuel nozzles are controlled by controlling apertures of the fuel flow rate control valves based on the ratio of the fuels.

Meanwhile, a second configuration provides the combustion control device for a gas turbine according to the first configuration, in which the gas turbine includes a combustor bypass valve for adjusting a bypass amount of compressed air to the combustor, and the bypass amount of the compressed air is regulated by controlling an aperture of the combustor bypass valve based on the combustion load command value computed by the combustion load command computing means.

Meanwhile, a third configuration provides the combustion control device for a gas turbine according to any one of the first and second configurations, in which the gas turbine includes gas turbine bypassing means for bypassing compressed air to any of the combustor and the gas turbine body. Here, the first gas turbine output computing means computes the first gas turbine output based on the intake-air temperature of the compressor, the aperture of the inlet guide vane, and a turbine bypass ratio equivalent to a ratio between a total amount of compressed air by the compressor and a turbine bypass flow rate by the gas turbine bypassing means, and the second gas turbine output computing means computes the second gas turbine output based on the intake-air temperature of the compressor, the aperture of the inlet guide vane, and the turbine bypass ratio.

Meanwhile, a fourth configuration provides the combustion control device for a gas turbine according to any one of the first, second, and third configurations, in which the first gas turbine output computing means computes the first gas turbine output based on the intake-air temperature of the compressor, the aperture of the inlet guide vane, and an atmospheric pressure ratio equivalent to a ratio between an intake pressure of the compressor and a standard atmospheric pressure or computes the first gas turbine output based on the intake-air temperature of the compressor, the aperture of the inlet guide vane, the turbine bypass ratio, and the atmospheric pressure ratio. Moreover, the second gas turbine output computing means computes the second gas turbine output based on the intake-air temperature of the compressor, the aperture of the inlet guide vane, and the atmospheric pressure ratio or computes the second gas turbine output based on the intake-air temperature of the compressor, the aperture of the inlet guide vane, the turbine bypass ratio, and the atmospheric pressure ratio.

Meanwhile, a fifth configuration provides the combustion control device for a gas turbine according to any one of the first, second, third, and fourth configurations, in which the second gas turbine output computing means computes the second gas turbine output corresponding to a maximum combustion gas temperature equivalent to the second combustion gas temperature at the inlet of the gas turbine, and the combustion control device includes learning means for comparing the first gas turbine output computed by the second gas turbine output computing means and an output of the gas turbine after a judgment that the combustion gas temperature at the inlet of the gas turbine reaches the maximum combustion gas temperature based on a temperature of exhaust gas discharged from the gas turbine body and on a pressure ratio of the compressor, and correcting the first gas turbine output so as to coincide with the output of the gas turbine.

According to the combustion control device for a gas turbine of the first aspect of the present invention, the respective fuel flow rate command values for the combustion gas are calculated based on the total fuel flow rate command value and the given ratios of the fuels. Then, the fuel gas flow rate is calculated based on this fuel flow rate command values and the function of the fuel flow rate command value and the fuel gas flow rate. Further, the Cv values for the respective fuel flow rate control valves are calculated by use of the Cv value formula based on this fuel gas flow rate, the fuel gas temperature, and the front pressures and the back pressures of the respective fuel flow rate control valves. Thereafter, the respective fuel flow rate control valve position command values are calculated based on the Cv values and the function of the Cv value and the fuel flow rate control valve position. Therefore, it is possible to determine the apertures of the respective fuel flow rate control valves (including a pilot fuel flow rate control valve, a top hat fuel flow rate control valve, and a main fuel flow rate control valve, for example) automatically so as to satisfy the given ratios of the fuels (including a pilot ratio, a top hat ratio, and a main ratio, for example). In other words, it is possible to calculate the respective fuel flow rate control valve position command values (including a pilot fuel flow rate control valve command value, a top hat fuel flow rate control valve position command value, a main fuel flow rate control valve position command value, for example) corresponding to the ratios of the fuels automatically.

Moreover, according to the combustion control device for a gas turbine of the second aspect, the ratios of the fuels are corrected based on the intake-air temperature. Therefore, it is possible to perform more appropriate combustion control relative to a variation in the intake-air temperature.

Meanwhile, according to the combustion control device for a gas turbine of the third aspect, the intake-air correction amount is adjusted in response to the gas turbine output (or the combustion load command value). Therefore, it is possible to perform intake-air temperature control appropriately in response to the load (the gas turbine output).

Moreover, the combustion control device for a gas turbine of the fourth aspect includes the fuel temperature correcting means for using the measurement value of the fuel temperature at the certain time period prior to occurrence of an anomaly of a fuel thermometer for measuring the fuel temperature as the fuel temperature in the event of the anomaly. Therefore, upon occurrence of the anomaly of the fuel thermometer attributable to disconnection or the like, it is possible to perform stable combustion control without causing a rapid variation in the combustion flow rate. In this way, it is possible to continue operation of the gas turbine.

Meanwhile, according to the combustion control device for a gas turbine of the fifth aspect, the fuel temperature correcting means includes the first primary delay operator and the second primary delay operator including the smaller primary delay time constant than the primary delay time constant of the first primary delay operator. Here, the primary delay calculations are performed by use of the first primary delay operator and the second primary delay operator in terms of the fuel temperature, and the smaller value of the calculation results is used as the fuel temperature. Therefore, it is possible to relax a change rate of the combustion gas temperature at the inlet of the gas turbine and to prevent excessive infusion of the fuel gas.

Moreover, the combustion control device for a gas turbine of the sixth aspect includes the pressure computing means for computing the back pressure of the fuel flow rate control valve corresponding to the front pressure of the fuel nozzle by use of the formula for computation of the front pressure of the fuel nozzle based on the fuel flow rate of the fuel nozzle derived from the fuel flow rate set up by the fuel flow rate setting means, the Cv value of the fuel nozzle, the fuel temperature, and the back pressure of the fuel nozzle. In addition, the combustion control device includes the pressure correcting means for using the pressure computed by the pressure computing means as the back pressure of the fuel flow rate control valve upon occurrence of an anomaly of the pressure gauge for measuring the back pressure of the fuel flow rate control valve. Therefore, it is possible to perform the combustion control of the gas turbine even in the case of the anomaly of the pressure gauge (such as a pilot manifold pressure gauge, a top hat manifold pressure gauge or a main manifold pressure gauge) attributable to disconnection or the like. In this way, it is possible to continue operation of the gas turbine.

Meanwhile, the combustion control device for a gas turbine of the seventh aspect includes the learning means for comparing the back pressure of the fuel flow rate control valve computed by the pressure computing means with the actual measurement value of the back pressure of the fuel flow rate control valve and correcting the Cv value of the fuel nozzle such that the computed value of the back pressure coincides with the actual measurement value of the back pressure. Therefore, it is possible to obtain more accurate nozzle Cv value and thereby to obtain a more accurate calculation value in terms of the back pressure.

DETAILED DESCRIPTION OF THE PREFERRED EMBODIMENT

Now, an embodiment of the present invention will be described in detail with reference to the accompanying drawings.

(Configuration)

Figure 1:
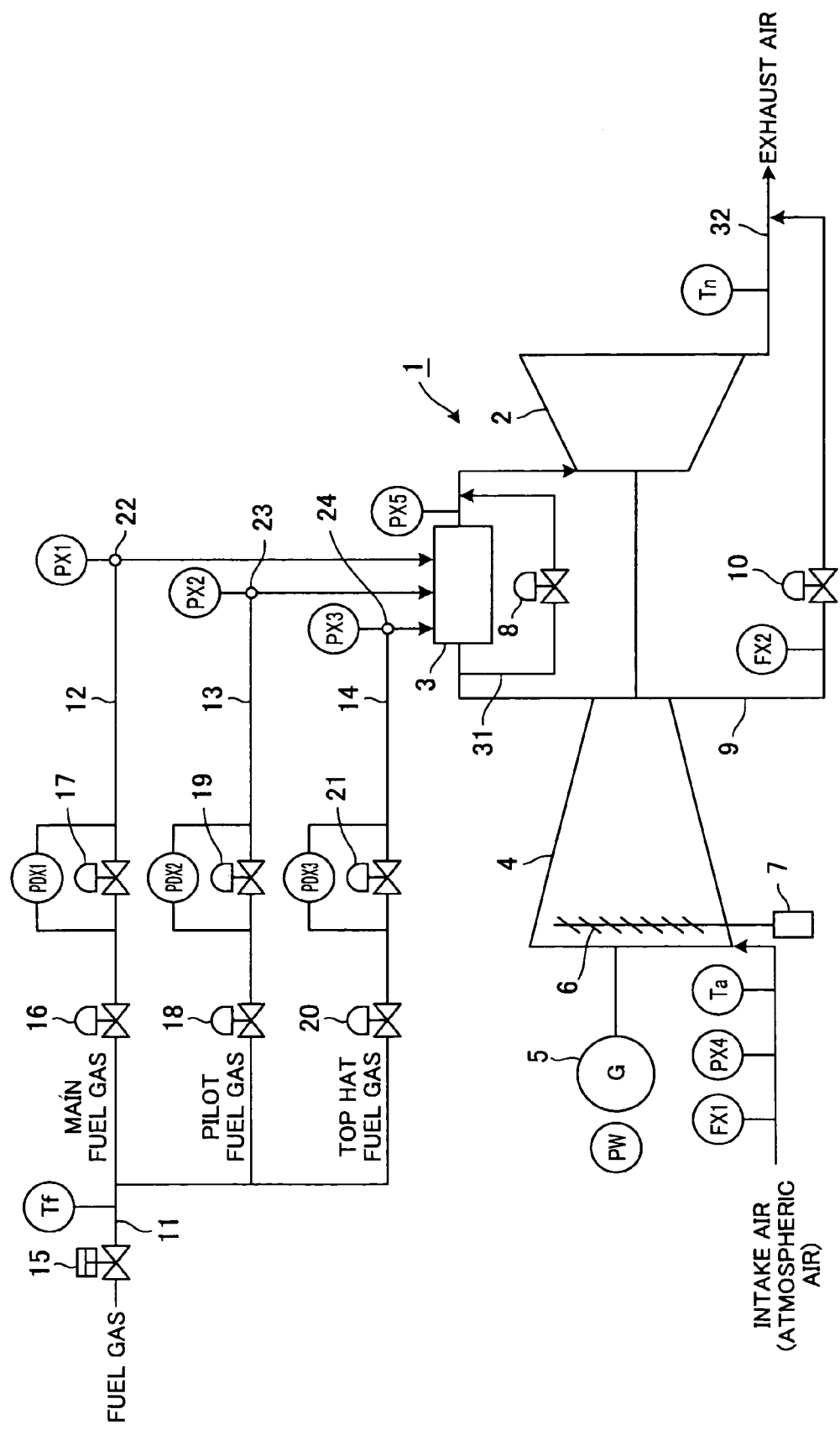
FIG. 1 is a view showing a schematic configuration of a gas turbine including a combustion control device for a gas turbine according to an embodiment of the present invention.

Firstly, a configuration of a gas turbine will be described with reference to FIG. 1 to FIG. 3. As shown in FIG. 1, a gas turbine 1 includes a gas turbine body 2, multiple combustors 3, and a compressor 4 having a rotating shaft joined to a rotating shaft of the gas turbine body 2. A power generator 5 is installed in this gas turbine 1 to collectively constitute a gas turbine power generation facility. A rotating shaft of this power generator 5 is also joined to the rotating shaft of the gas turbine body 2.

Therefore, a fuel is combusted in each of the combustors 3 together with a high-pressure compressed air taken in and compressed by the compressor 4. When the gas turbine body 2 is rotated by this combustion gas, the power generator 5 is driven rotatively by this gas turbine body 2 to generate power. The power generated by the power generator 5 is transmitted through an unillustrated power transmission system. The combustion gas (exhaust gas) discharged from the gas turbine body 2 after working the gas turbine body 2 is carried through an exhaust line 32 and released from an unillustrated stack to the air. An air-intake amount of the compressor 4 in the course of this gas turbine drive is controlled by opening and closing inlet guide vanes (IGVs) 6 installed at an inlet of the compressor 4. The opening and closing drives of the IGVs 6 are carried out by an actuator 7 such as a servo motor, which is fitted to the IGVs 6. Aperture control of the IGVs 6 (drive control of the actuator 7) is performed by an unillustrated IGV control device.

Meanwhile, each of the combustors 3 is provided with a combustor bypass line 31 for causing the air compressed by the compressor 4 to bypass the combustor 3. The combustor bypass line 31 is provided with a combustor bypass valve 8 for adjusting a bypassing flow rate of the compressed air. At the time of a low load, an aperture of the combustor bypass valve 8 is increased and the bypassing flow rate of the compressed air is thereby increased in order to raise the fuel gas density and to stabilize combustion. On the contrary, at the time of a high load, the aperture of the combustor bypass valve 8 is reduced and the bypassing flow rate of the compressed air is thereby reduced in order to decrease NOx and the like. In this way, the amount of the compressed air to be mixed with the combustion gas is increased. Meanwhile, a turbine bypass line 9 for causing the air compressed by the compressor 4 to by pass the combustor 3 and the gas turbine body 2 is provided in a space from an outlet side of the compressor to an outlet side (the exhaust line 32) of the gas turbine body 2. This turbine bypass line 9 is provided with a turbine bypass valve 10 for adjusting a turbine bypass flow rate of the compressed air (gas turbine bypassing means). This valve is provided for the purpose of adjusting an output pressure of the compressor 4 (a cylinder pressure) and the like.

Figure 2:
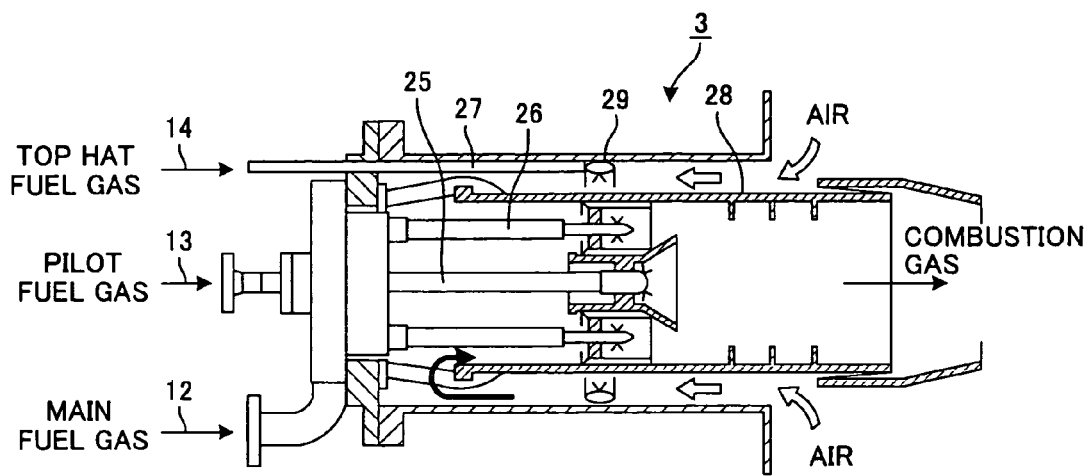
FIG. 2 is a view showing a structure of a combustor in the gas turbine.

Each of the combustors 3 has a configuration as shown in FIG. 2. As shown in FIG. 2, the combustor 3 includes multiple types of fuel nozzles, namely, main nozzles 26 as first fuel nozzles, a pilot nozzle 25 as a second fuel nozzle, and top hat nozzles 27 as third fuel nozzles. The pilot nozzle 25 and the main nozzles 26 are disposed inside an inner cylinder 28, while the top hat nozzles 27 are disposed in a space between the inner cylinder 28 and an outer cylinder 29.

The pilot nozzle 25 is a fuel nozzle for diffuse combustion targeted for achieving combustion stability and the like. The single pilot nozzle 25 is provided at a central part of the inner cylinder 28. The main nozzle 26 is a fuel nozzle for premixed combustion targeted for NOx reduction, which is designed to mix main fuel gas with the compressed air on an upstream side of a combustion portion and then to subject the mixed gas to combustion. The multiple main nozzles 26 are provided around the pilot nozzle 25. The top hat nozzle 27 is a fuel nozzle for premixed combustion targeted for further NOx reduction, which is designed to mix top hat fuel gas with the compressed air on an upstream side of the main nozzles 26 and then to subject the mixed gas to combustion. The multiple top hat nozzles 27 are provided on the outer peripheral side of the main nozzles 26.

Moreover, as shown in FIGS. 1 and 2, a main fuel supply line 12, a pilot fuel supply line 13, and a top hat fuel supply line 14 which are branched off from a fuel gas supply line 11 connected to an unillustrated fuel tank or gas field are connected respectively to the main nozzles 26, the pilot nozzle 25, and the top hat nozzles 27 of each of the combustors 3. The main fuel supply line 12 is provided with a main fuel pressure control valve 16 and a main fuel flow rate control valve 17 in the order from the upstream side. The pilot fuel supply line 13 is provided with a pilot fuel pressure control valve 18 and a pilot fuel flow rate control valve 19 in the order from the upstream side. Moreover, the top hat fuel supply line 14 is provided with a top hat fuel pressure control valve 20 and a top hag fuel flow rate control valve 21 in the order from the upstream side.

A main manifold 22 of the main fuel supply line 12 is provided with a main manifold pressure gauge PX1 for measuring a pressure of the main fuel gas inside the main manifold 22. A pilot manifold 23 of the pilot fuel supply line 13 is provided with a pilot manifold pressure gauge PX2 for measuring a pressure of pilot fuel gas inside the pilot manifold 23. Moreover, a top hat manifold 24 of the top hat fuel supply line 14 is provided with a top hat manifold pressure gauge PX3 for measuring a pressure of the top hat fuel gas inside the top hat manifold 24.

Meanwhile, the main fuel supply line 12 is provided with a main fuel differential pressure gauge PDX1 for measuring a main fuel gas differential pressure in front and on the back of the main fuel flow rate control valve 17. The pilot fuel supply line 13 is provided with a pilot fuel differential pressure gauge PDX2 for measuring a pilot fuel gas differential pressure in front and on the back of the pilot fuel flow rate control valve 19. Moreover, the top hat fuel supply line 14 is provided with a top hat fuel differential pressure gauge PDX3 for measuring a top hat fuel gas differential pressure in front and on the back of the top hat fuel flow rate control valve 21.

Figure 3:
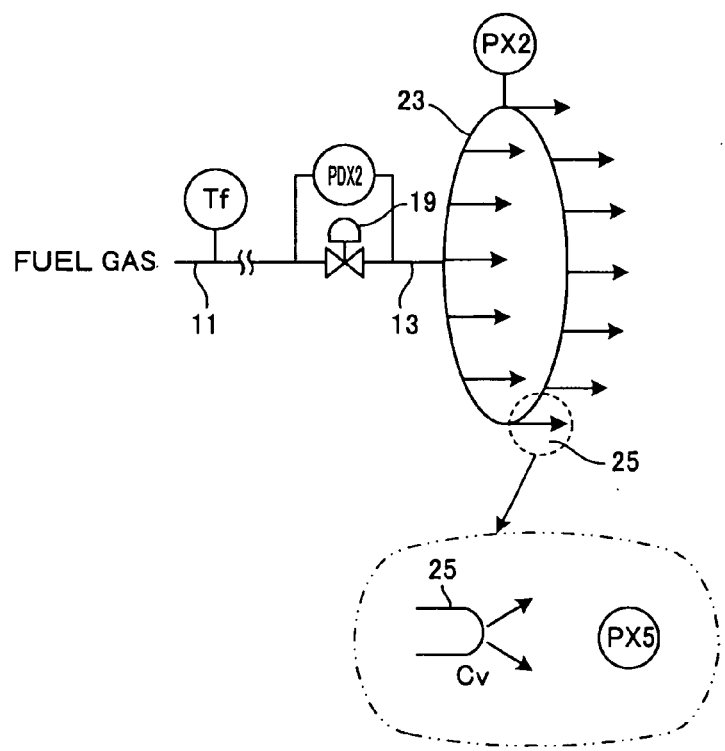
FIG. 3 is a block diagram showing a pilot manifold portion of a pilot fuel supply line in the gas turbine.

As schematically shown in FIG. 3, the pilot manifold 23 is configured to distribute the pilot fuel gas, which is supplied through the pilot fuel supply line 13, to the pilot nozzles 25 of the respective combustors 3. Although illustration is omitted therein, the main manifold 22 is similarly configured to distribute the main fuel gas supplied through the main fuel supply line 12 to the main nozzles 26 of the respective combustors 3, and the top hat manifold 24 is also configured to distribute the top hat fuel gas supplied through the top hat fuel supply line 14 to the top hat nozzles 27 of the respective combustors 3.

Meanwhile, the main fuel pressure control valve 16 is configured to adjust the main fuel gas differential pressure in front and on the back of the main fuel flow rate control valve 17, which is measured by the main fuel differential pressure gauge PDX1, to a constant value. The pilot fuel pressure control valve 18 is configured to adjust the pilot fuel gas differential pressure in front and on the back of the pilot fuel flow rate control valve 19, which is measured by the pilot fuel differential pressure gauge PDX2, to a constant value. Moreover, the top hat fuel pressure control valve 20 is configured to adjust the top hat fuel gas differential pressure in front and on the back of the top hat fuel flow rate control valve 21, which is measured by the top hat fuel differential pressure gauge PDX3, to a constant value.

Further, the main fuel flow rate control valve 17 is configured to adjust a flow rate of the main fuel gas which is supplied to the main nozzles 26 of all of the combustors 3 through the main fuel supply line 12. The pilot fuel flow rate control valve 19 is configured to adjust a flow rate of the pilot fuel gas which is supplied to the pilot nozzles 25 of all of the combustors 3 through the pilot fuel supply line 13. Moreover, the top hat fuel flow rate control valve 21 is configured to adjust a flow rate of the top hat fuel gas which is supplied to the top hat nozzles 27 of all of the combustors 3 through the top hat fuel supply line 14.

Meanwhile, as shown in FIG. 1, the fuel supply line 11 is provided with a fuel stop valve 15 and a fuel gas thermometer Tf. The fuel gas thermometer Tf measures the temperature of the fuel gas flowing on the fuel gas supply line 11 and outputs a measurement signal in terms of this fuel gas temperature to a gas turbine combustion control device 41 (see FIG. 4) fitted to this gas turbine 1, and the like. Measurement signals from the main manifold pressure gauge PX1, the pilot manifold pressure gauge PX2, the top hat manifold pressure gauge PX3, the main fuel differential pressure gauge PDX1, the pilot fuel differential pressure gauge PDX2, and the top hat fuel differential pressure gauge PDX3 are also outputted to the gas turbine combustion control device 41 and the like.

Moreover, the power transmission system of the power generator 5 is provided with a power meter PW. An intake-air thermometer Ta, an intake-air pressure gauge PX4, and an intake-air flowmeter FX1 are provided on the inlet side of the compressor 4, while a cylinder pressure gauge PX5 is provided on the outlet side of the compressor 4. The turbine bypass line 9 is provided with a turbine bypass flowmeter FX2. The exhaust line 32 is provided with an exhaust gas thermometer Th.

The power meter PW measures generated power (the power generator output: the gas turbine output) of the power generator 5 and outputs a measurement signal of this power generator output (the gas turbine output) to the gas turbine combustion control device 41 and the like. The intake-air thermometer Ta measures the intake-air temperature in the compressor 4 (the temperature of the air flowing into the compressor 4) and outputs a measurement signal of this intake-air temperature to the gas turbine combustion control device 41 and the like. The intake-air pressure gauge PX4 measures the intake-air pressure of the compressor 4 (the pressure of the air flowing into the compressor 4) and outputs a measurement signal of this intake-air pressure to the gas turbine combustion control device 41 and the like. The intake-air flowmeter FX1 measures the flow rate of the intake air flowing into the compressor 4 and outputs a measurement signal of this intake-air flow rate to the gas turbine combustion control device 41 and the like. The cylinder pressure gauge PX5 measures the cylinder pressure representing the pressure of the compressed air to be ejected from the compressor 4 and outputs a measurement signal of this cylinder pressure to the gas turbine combustion control device 41 and the like. The turbine bypass flowmeter FX2 measures the turbine bypass flow rate of the compressed air flowing through the turbine bypass line 9 and outputs a measurement signal of this turbine bypass flow rate to the gas turbine combustion control device 41 and the like. The exhaust gas thermometer Th measures the temperature of the exhaust gas discharged from the gas turbine body 2 and outputs a measurement signal of this exhaust gas temperature to the gas turbine combustion control device 41 and the like.

Next, the gas turbine combustion control device 41 will be described with reference to FIG. 4 to FIG. 33. Here, respective processing functions of the gas turbine combustion control device 41 are constructed in the form of software (computer programs) that is executed by a computer. However, the present invention will not be limited only to this configuration. It is also possible to construct the processing functions in the form of hardware.

Figure 4:
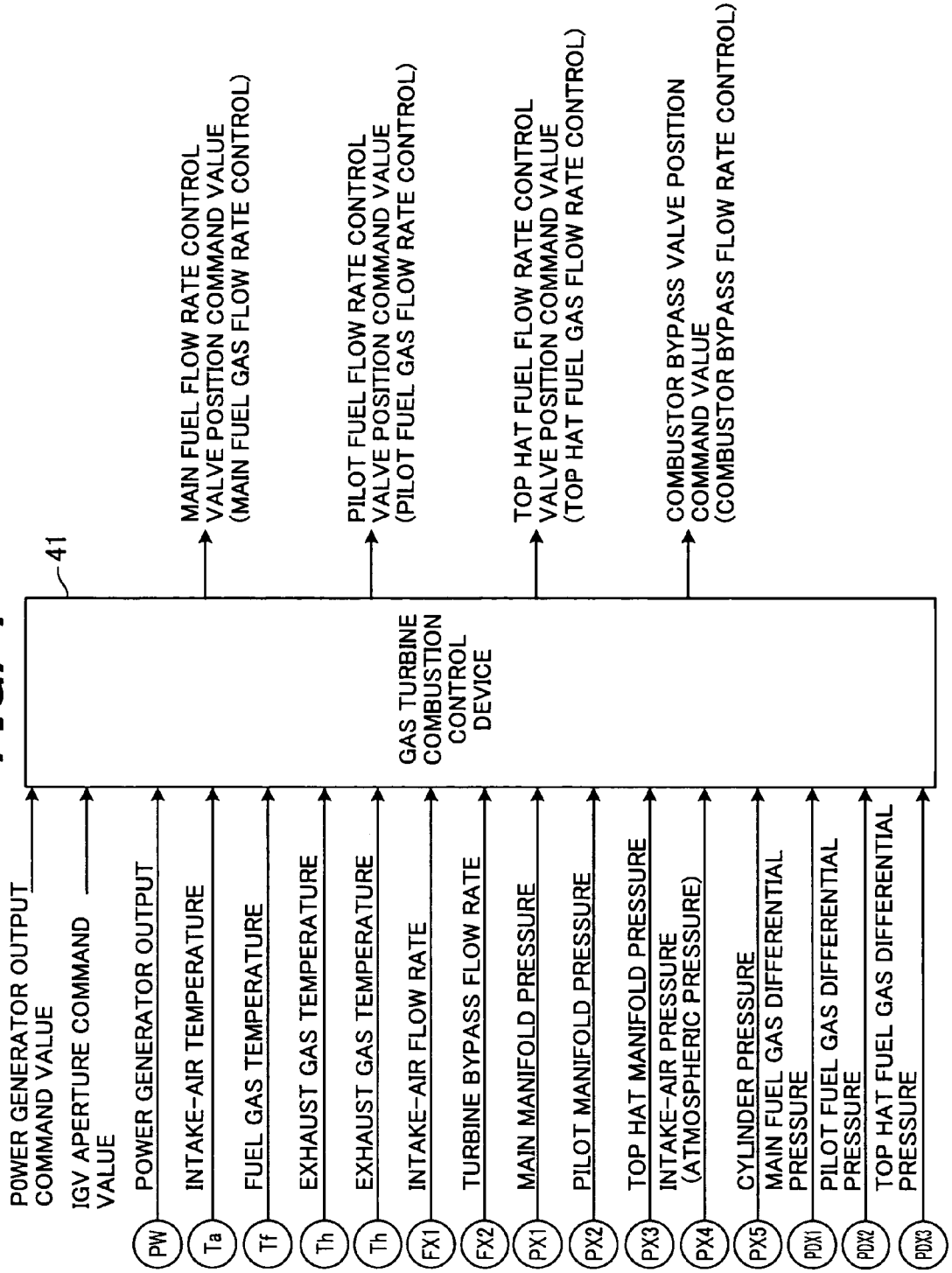
FIG. 4 is an overall block diagram showing the combustion control device for a gas turbine according to the embodiment of the present invention.

As shown in FIG. 4, a power generator output command value transmitted from an unillustrated central load dispatching center, and an IGV aperture command value transmitted from the unillustrated IGV control device are inputted to the gas turbine combustion control device 41. Here, the power generator output command value is not always required to be transmitted from the central load dispatching center. For example, the power generator output command value may be set up by a power generator output setting device that is installed in the gas turbine power generation facility. Moreover, the IGV aperture command value is adopted as the IGV aperture used for computation of a CLCSO (a combustion load command) in this case. However, the present invention will not be limited only to this configuration. For example, in the case of measuring the IGV aperture, it is possible to use this measurement value instead.

In addition, the power generator output measured by the power meter PW, the intake-air temperature measured by the intake-air thermometer Ta, the fuel gas temperature measured by the fuel gas thermometer Tf, the exhaust gas temperature measured by the exhaust gas thermometer Th, the intake-air flow rate measured by the intake-air flowmeter FX1, the turbine bypass flow rate measured by the turbine bypass flowmeter FX2, the main manifold pressure measured by the main manifold pressure gauge PX1, the pilot manifold pressure measured by the pilot manifold pressure gauge PX2, the top hat manifold pressure measured by the top hat manifold pressure gauge PX3, the intake-air pressure measured by the intake-air pressure gauge PX4, the cylinder pressure measured by the cylinder pressure gauge PX5, the main fuel gas differential pressure measured by the main fuel differential pressure gauge PDX1, the pilot fuel gas differential pressure measured by the pilot fuel differential pressure gauge PDX2, and the top hat fuel gas differential pressure measured by the top hat fuel differential pressure gauge PDX3 are inputted as actual measured values to the gas turbine combustion control device 41.

Thereafter, based on these input signals and the like, the gas turbine combustion control device 41 calculates a main fuel flow rate control valve position command value for performing main fuel gas flow rate control, a pilot fuel flow rate control valve position command value for performing pilot fuel gas flow rate control, a top hat fuel flow rate control valve position command value for performing top hat fuel gas flow rate control, and a combustor bypass valve position command value for performing combustion bypassing flow rate control.

Figure 5:
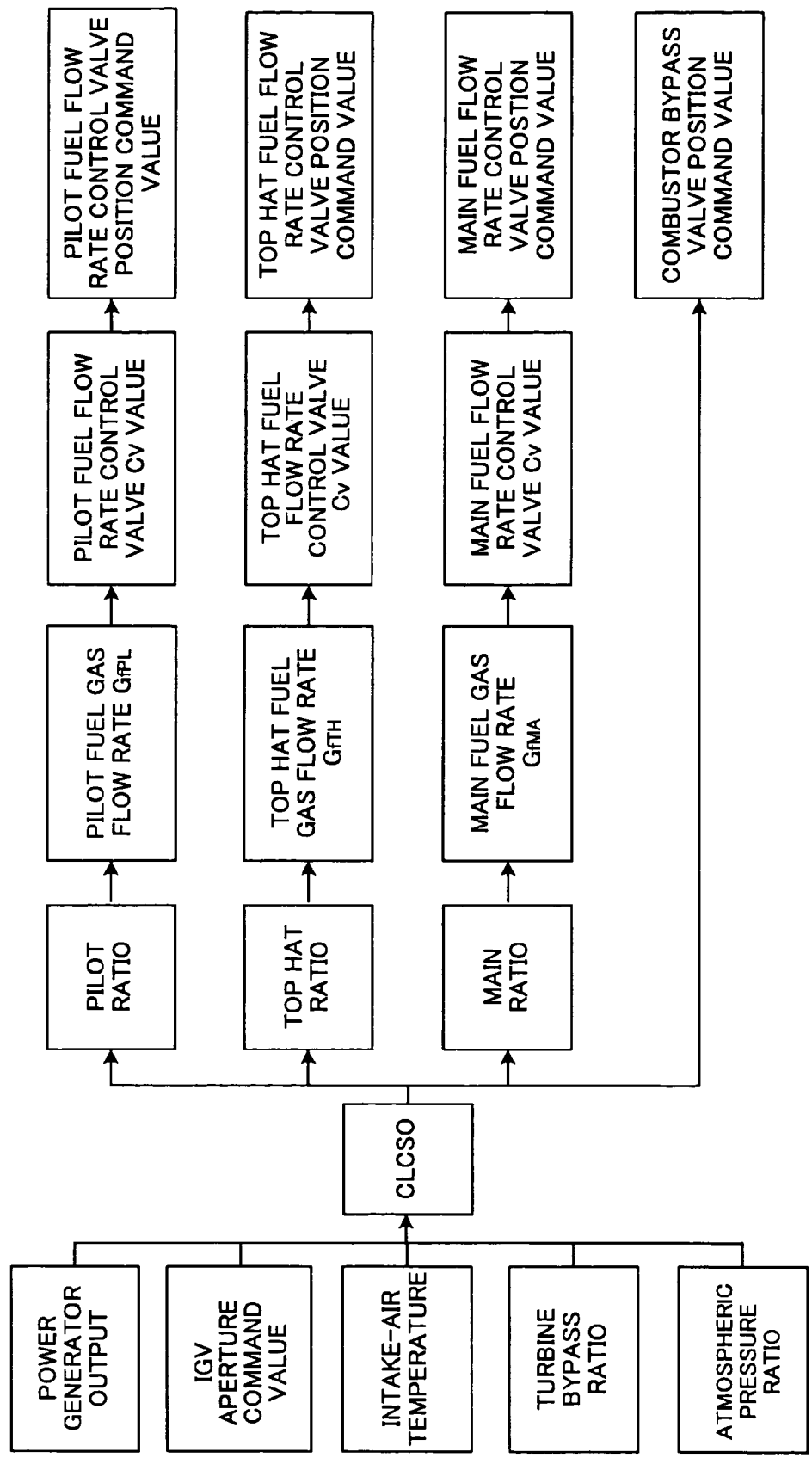
FIG. 5 is a block diagram showing an outline of a process flow in the combustion control device for a gas turbine.

An outline of a process flow in the gas turbine combustion control device 41 will be described with reference to FIG. 5. Firstly, the CLCSO is computed based on the power generator output, the IGV aperture command value, the intake-air temperature, a turbine bypass ratio (the turbine bypass flow rate/ the intake-air flow rate) representing a ratio between the intake-air flow rate and the turbine bypass flow rate, and an atmospheric pressure ratio (an atmospheric pressure/a standard atmospheric pressure) representing a ratio between the atmospheric pressure and the standard atmospheric pressure. This CLCSO is equivalent to a value obtained by rendering a combustion gas temperature at an inlet of a gas turbine (a temperature of the fuel gas at an inlet of the gas turbine body when the fuel gas flow from the combustor 3 to the gas turbine body 2) dimensionless. In other words, the CLCSO is a value proportional to the combustion gas temperature at the inlet of the gas turbine. Thereafter, a pilot ratio representing a ratio of a pilot fuel gas flow rate (a weight flow rate) relative to a total fuel gas flow rate (a weight flow rate), a top hat ratio representing a ratio of a top hat fuel gas flow rate (a weight flow rate) relative to the total fuel gas flow rate (the weight flow rate), and a main ratio representing a ratio of a main fuel gas flow rate (a weight flow rate) relative to the total fuel gas flow rate (the weight flow rate) are calculated based on this CLCSO.

Subsequently, the respective weight flow rates, namely, the pilot fuel gas flow rate $G_{fPL}$, the top hat fuel gas flow rate $G_{fTH}$, and the main fuel gas flow rate $G_{fMA}$ are calculated based on the pilot ratio, the top hat ratio, and the main ratio, respectively. Further, a Cv value of the pilot fuel flow rate control valve 19, a Cv value of the top hat fuel flow rate control valve 21, and a Cv value of the main fuel flow rate control valve 17 are calculated based on the pilot fuel gas flow rate $G_{fPL}$, the top hat fuel gas flow rate $G_{fTH}$, and the main fuel gas flow rate $G_{fMA}$, respectively. Then, the pilot fuel flow rate control valve position command value, the top hat fuel flow rate control valve position command value, and the main fuel flow rate control valve position command value based on the Cv value of the pilot fuel flow rate control valve 19, the Cv value of the top hat fuel flow rate control valve 21, and the Cv value of the main fuel flow rate control valve 17, respectively. Meanwhile, in terms of the combustor bypass valve 8, the combustor bypass valve position command value is calculated based on the CLCSO as well.

Next, the processing to be executed by the gas turbine combustion control device 41 will be described in detail. In the following, the processing to calculate the CLCSO will be firstly described concerning the processing of the gas turbine combustion control device 41. Then, the processing for calculating the respective valve position command values based on this CLCSO will be described.

(Computation of CLCSO)

Figure 6:
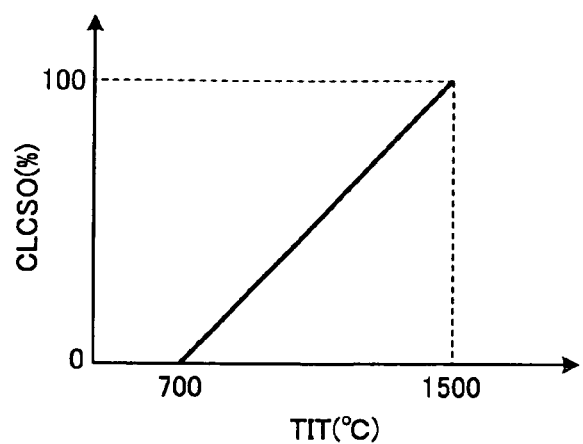
FIG. 6 is a graph showing a relation between a combustion gas temperature TIT at an inlet of the gas turbine and a CLCSO.

In order to formulate the pilot ratio, the top hat ratio, the main ratio, and the aperture of the combustor bypass valve into functions of the combustion gas temperature TIT at the inlet of the gas turbine representing original concepts, the CLCSO formed by rendering the combustion gas temperature TIT at the inlet of the gas turbine dimensionless is applied as a control parameter. For this reason, the CLCSO is computed to begin with. As shown in FIG. 6, the CLCSO is assumed to be proportional to the combustion gas temperature TIT at the inlet of the gas turbine (CLCSO∝TIT). Here, in the illustrated example, the CLCSO corresponding to the combustion gas temperature TIT at the inlet of the gas turbine of 700° C., which is defined as a first combustion gas temperature at the inlet of the gas turbine, is assumed to be 0%. Meanwhile, the CLCSO corresponding to the combustion gas temperature TIT at the inlet of the gas turbine of 1500° C., which is defined as a second combustion gas temperature at the inlet of the gas turbine, is assumed to be 100%. It is to be noted that the first combustion gas temperature at the inlet of the gas turbine as well as the second combustion gas temperature at the inlet of the gas turbine constituting the criteria for computing the CLCSO are not limited only to the 700° C. and 1500° C. It is possible to set up other temperatures as appropriate.

Figure 7:
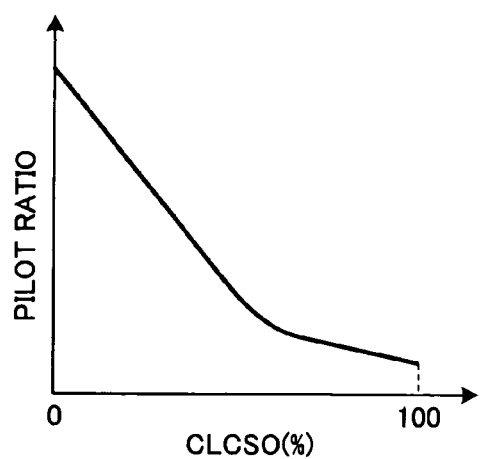
FIG. 7 is a graph showing a relation between the CLCSO and a pilot ratio.
Figure 8:
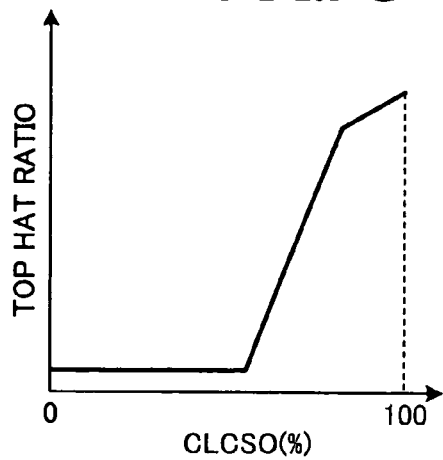
FIG. 8 is a graph showing a relation between the CLCSO and a top hat ratio.
Figure 9:
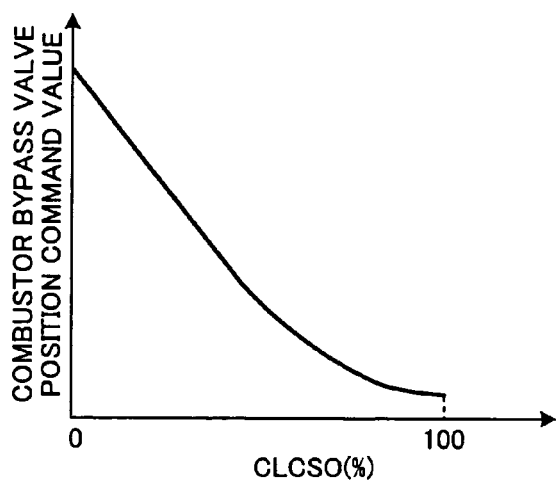
FIG. 9 is a graph showing a relation between the CLCSO and a combustor bypass valve position command value.

Moreover, a relation (a function) between the CLCSO and the pilot ratio as shown in FIG. 7 as an example, a relation (a function) between the CLCSO and the top hat ratio as shown in FIG. 8 as an example, and a relation (a function) between the CLCSO and the combustor bypass valve position command value (BYCSO) as shown in FIG. 9 as an example are set up in advance. Relations of the combustion gas temperature TIT at the inlet of the gas turbine with the pilot ratio, the top hat ratio, and the aperture of the combustor bypass valve can be obtained in preliminary studies (in gas turbine designing processes). Accordingly, based on these relations, it is possible to set up the relations of the CLCSO with the pilot ratio, the top hat ratio, and the combustor bypass valve position command value (BYCSO) as shown in FIG. 7 to FIG. 9 as examples. Moreover, by calculating the pilot ratio, the top hat ratio, and the aperture of the combustor bypass valve by use of the computed CLCSO and the relations show in FIG. 7 to FIG. 9, the pilot ratio, the top hat ratio, and the aperture of the combustor bypass valve are uniquely determined relative to the combustion gas temperature TIT at the inlet of the gas turbine because the CLCSO is proportional to the combustion gas temperature TIT at the inlet of the gas turbine (CLCSO∝TIT). That is, the pilot ratio, the top hat ratio, and the aperture of the combustion bypass valve become functions of the CLCSO (the combustion gas temperature TIT at the inlet of the gas turbine). Since the main ratio is calculated based on the pilot ratio and the top hat ratio (to be described later in detail), the main ratio also becomes a function of the CLCSO (the combustion gas temperature TIT at the inlet of the gas turbine).

Figure 10:
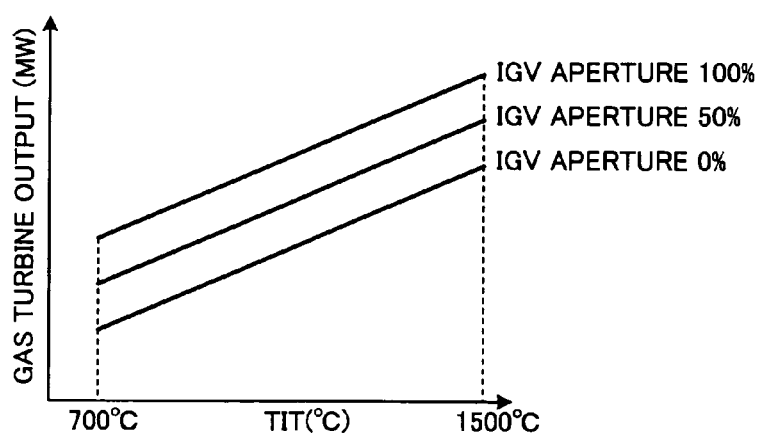
FIG. 10 is a graph showing a relation between the combustion gas temperature TIT at the inlet of the gas turbine and a gas turbine output (a power generator output) in terms of various IGV apertures.
Figure 11:
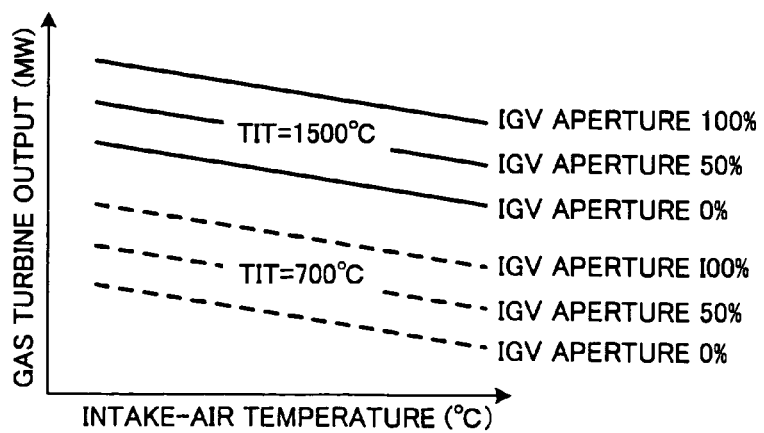
FIG. 11 is a graph showing a relation between an intake-air temperature and the gas turbine output (the power generator output) in terms of the various IGV apertures.

The CLCSO is computed based on the gas turbine output (the power generator output). Specifically, a relation between the combustion gas temperature TIT at the inlet of the gas turbine and the gas turbine output (the power generator output) in terms of various IGV apertures is shown in FIG. 10, and a relation between the intake-air temperature and the gas turbine output (the power generator output) in terms of the various IGV apertures is shown in FIG. 11. As shown in FIGS. 10 and 11, in terms of the various IGV apertures, it is possible to treat the combustion gas temperature TIT at the inlet of the gas turbine is in the linear relation with the gas turbine output (the power generator output). Therefore, the combustion gas temperature TIT at the inlet of the gas turbine, i.e. the CLCSO is derived from the gas turbine output (the power generator output).

Figure 12:
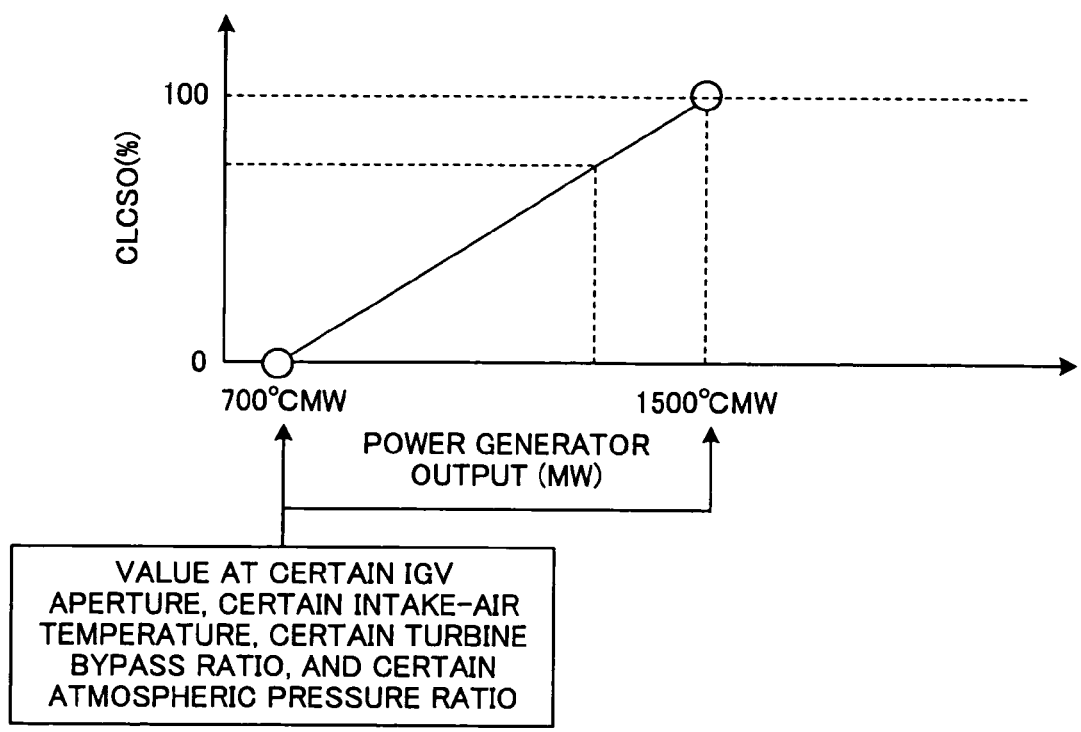
FIG. 12 is a graph showing a relation between the power generator output (the gas turbine output) at a certain IGV aperture, a certain intake-air temperature, a certain turbine bypass ratio and a certain atmospheric pressure ratio, and the CLCSO.

For this reason, a relation (a function) between the power generator output (the gas turbine output) and the CLCSO is set up while considering the IGV apertures and the intake-air temperatures shown in FIG. 12 and also considering the turbine bypass ratio and the atmospheric pressure (air pressure/standard atmospheric pressure: an average atmospheric pressure in a place where the gas turbine is installed is used as the standard atmospheric pressure, for example).

Specifically, a 700° C. MW value representing the power generator output (the gas turbine output) when the combustion gas temperature TIT at the inlet of the gas turbine is equal to 700° C. that is determined as the first combustion gas temperature at the inlet of the gas turbine, and a 1500° C. MW value representing the power generator output (the gas turbine output) when the combustion gas temperature TIT at the inlet of the gas turbine is equal to 1500° C. that is determined as the second combustion gas temperature at the inlet of the gas turbine are set up in the first place. Here, the temperature of 1500° C. is a maximum combustion gas temperature (an upper limit) determined in the gas turbine designing processes in terms of durability of the combustor 3 and the gas turbine body 2. Since the temperature is adjusted not to exceed this value, the temperature of 1500° C. is also referred to as a temperature controlled MW. These temperatures of 700° C. and 1500° C. (the temperature controlled MW) can be calculated in the preliminary studies (in the gas turbine designing processes).

Then, as shown in FIG. 12, the CLCSO relative to the 700° C. MW is defined as 0% and the CLCSO relative to the 1500° C. MW value is defined as 100%. It is to be noted, however, that the 700° C. MW value and the 1500° C. MW value are the values considering the IGV aperture, the intake-air temperature, the turbine bypass ratio, and the atmospheric pressure ratio. That is, these values respectively represent the power generator output (the gas turbine output) at the combustion gas temperature TIT at the inlet of the gas turbine of 700° C. and the power generator output (the gas turbine output) at the combustion gas temperature TIT at the inlet of the gas turbine of 1500° C. in terms of a certain IGV aperture, a certain intake-air temperature, a certain turbine bypass ratio, and a certain pressure ratio.

Figure 13:
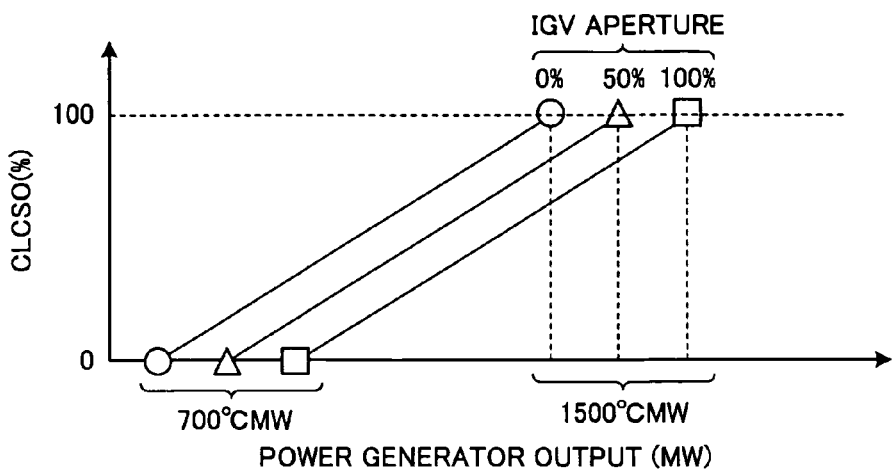
FIG. 13 is a graph showing the relation between the power generator output (the gas turbine output) and the CLCSO relative to a variation in the IGV aperture.
Figure 14:
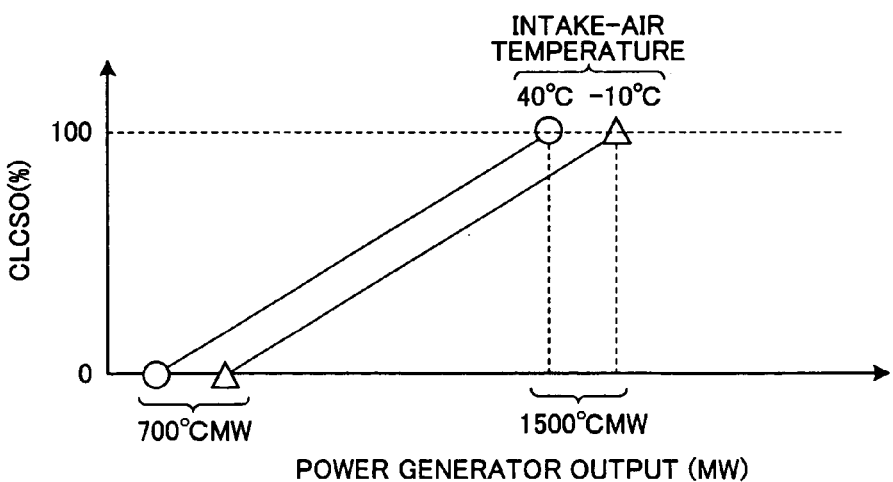
FIG. 14 is a graph showing the relation between the power generator output (the gas turbine output) and the CLCSO relative to a variation in the intake-air temperature.
Figure 15:
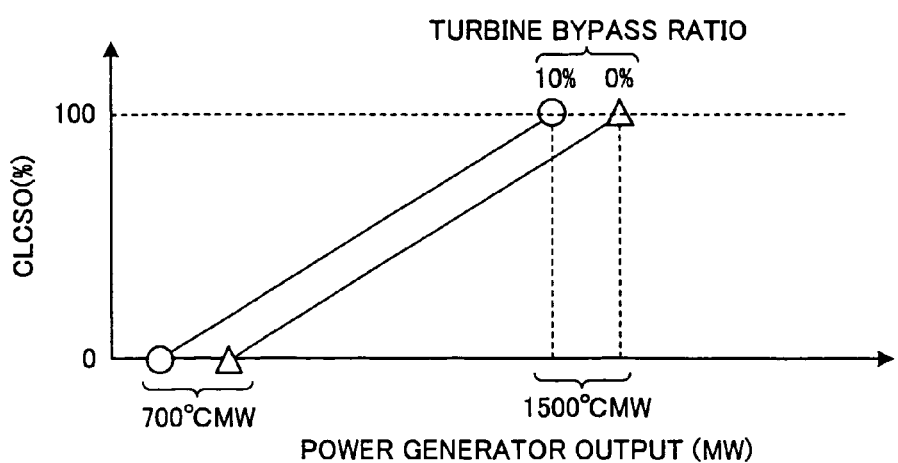
FIG. 15 is a graph showing the relation between the power generator output (the gas turbine output) and the CLCSO relative to a variation in the turbine bypass ratio.

In other words, as shown in FIG. 13 as an example, the relation between the power generator output (the gas turbine output) and the CLCSO varies depending on the IGV aperture (such as 0% (when an intake-air passage is not completely closed), 50% or 100%). As shown in FIG. 14 as an example, the relation between the power generator output (the gas turbine output) and the CLCSO also varies depending on the intake-air temperature (such as −10° C. and 40° C.). Moreover, as shown in FIG. 15 as an example, the relation between the power generator output (the gas turbine output) and the CLCSO also varies depending on the turbine bypass ratio. Although illustration is omitted herein, the relation between the power generator output (the gas turbine output) and the CLCSO also varies depending on the atmospheric pressure ratio (such as 1.0 or 1.1).

For this reason, the 1500° C. MW values corresponding to the IGV aperture, the intake-air temperature, the turbine bypass ratio, and the atmospheric pressure are set up in advance. Table 1 shown below exemplifies the preset 1500° C. MW values corresponding to the IGV aperture, the intake-air temperature, the turbine bypass ratio, and the atmospheric pressure ratio. The example shown in Table 1 sets up the 1500° C. MW values in the cases where the IGV aperture is equal to any one of 0%, 50%, and 100%, the intake-air temperature is equal to any one of −10° C. and 40° C., and the turbine bypass ratio is equal to 10%. These values are obtained in the preliminary studies (in the gas turbine designing processes). Here, the 1500° C. MW value in the case where the turbine bypass ratio is equal to 0% is solely determined by the IGV aperture and the intake-air temperature. For example, the 1500° C. MW value is equal to 140 MW when the IGV aperture (the IGV aperture command) is equal to 100%, the intake-air aperture is equal to −10° C., and the turbine bypass ratio is equal to 0%, while the 1500° C. MW value is equal to 110 MW when the IGV aperture is equal to 100%, the intake-air aperture is equal to −10° C., and the turbine bypass ratio is equal to 10%.

TABLE 1

When TIT = 1500° C. (1500° C. MW)

|  |  | IGV aperture | | |
|---|---|---|---|---|
|  |  | 0% | 50% | 100% |
| Intake-air temperature | −10° C. | 100 MW (70 MW at turbine bypass ratio equal to 10%) | 120 MW (90 MW at turbine bypass ratio equal to 10%) | 140 MW (110 MW at turbine bypass ratio equal to 10%) |
|  | 40° C. | 80 MW (50 MW at turbine bypass ratio equal to 10%) | 100 MW (70 MW at turbine bypass ratio equal to 10%) | 120 MW (90 MW at turbine bypass ratio equal to 10%) |

If any values of the IGV aperture, the intake-air temperature, and the turbine bypass ratio is different from those shown in Table 1 (when the IGV aperture is equal to 60%, the intake-air temperature is equal to 10° C., and the turbine bypass ratio is equal to 5%, for example), the 1500° C. MW value corresponding to the IGV aperture, the intake-air temperature, and the turbine bypass ratio can be computed by linear interpolation (interpolating calculation) by use of any of the 1500° C. MW values shown in Table 1.

Moreover, by multiplying the 1500° C. MW value considering the IGV aperture, the intake-air temperature, and the turbine bypass ratio by the atmospheric pressure ratio, it is possible to compute the 1500° C. MW value while considering the atmospheric pressure ratio as well.

Although detailed explanation will be omitted herein, it is also possible to calculate the value considering the IGV aperture, the intake-air temperature, the turbine bypass ratio, and the atmospheric pressure ratio in a similar manner to the case of 1500° C. MW value. Table 2 shown below exemplifies the preset 700° C. MW values corresponding to the IGV aperture, the intake-air temperature, the turbine bypass ratio, and the atmospheric pressure ratio.

TABLE 2

When TIT = 700° C. (700° C. MW)

|  |  | IGV aperture | | |
|---|---|---|---|---|
|  |  | 0% | 50% | 100% |
| Intake-air temperature | −10° C. | 5 MW (3 MW at turbine bypass ratio equal to 10%) | 6 MW (4 MW at turbine bypass ratio equal to 10%) | 7 MW (5 MW at turbine bypass ratio equal to 10%) |
|  | 40° C. | 3 MW (1 MW at turbine bypass ratio equal to 10%) | 4 MW (2 MW at turbine bypass ratio equal to 10%) | 5 MW (3 MW at turbine bypass ratio equal to 10%) |

Then, upon determination of the 700° C. MW and 1500° C. MW values while considering the IGV aperture, the intake-air temperature, the turbine bypass ratio, and the atmospheric pressure ratio, the CLCSO is computed in accordance with the following formula (1) representing the direct interpolation (interpolating calculation) formula based on the 700° C. MW and 1500° C. MW values and an actual measurement value of the gas turbine output (the power generator output):

$$CLCSO(\%) = \frac{\text{Actual value of gas turbine output(MW)} - 700° \text{ C.MW}}{1500° \text{ C.MW} - 700° \text{ C.MW}} \times 100 \quad (1)$$

Figure 16:
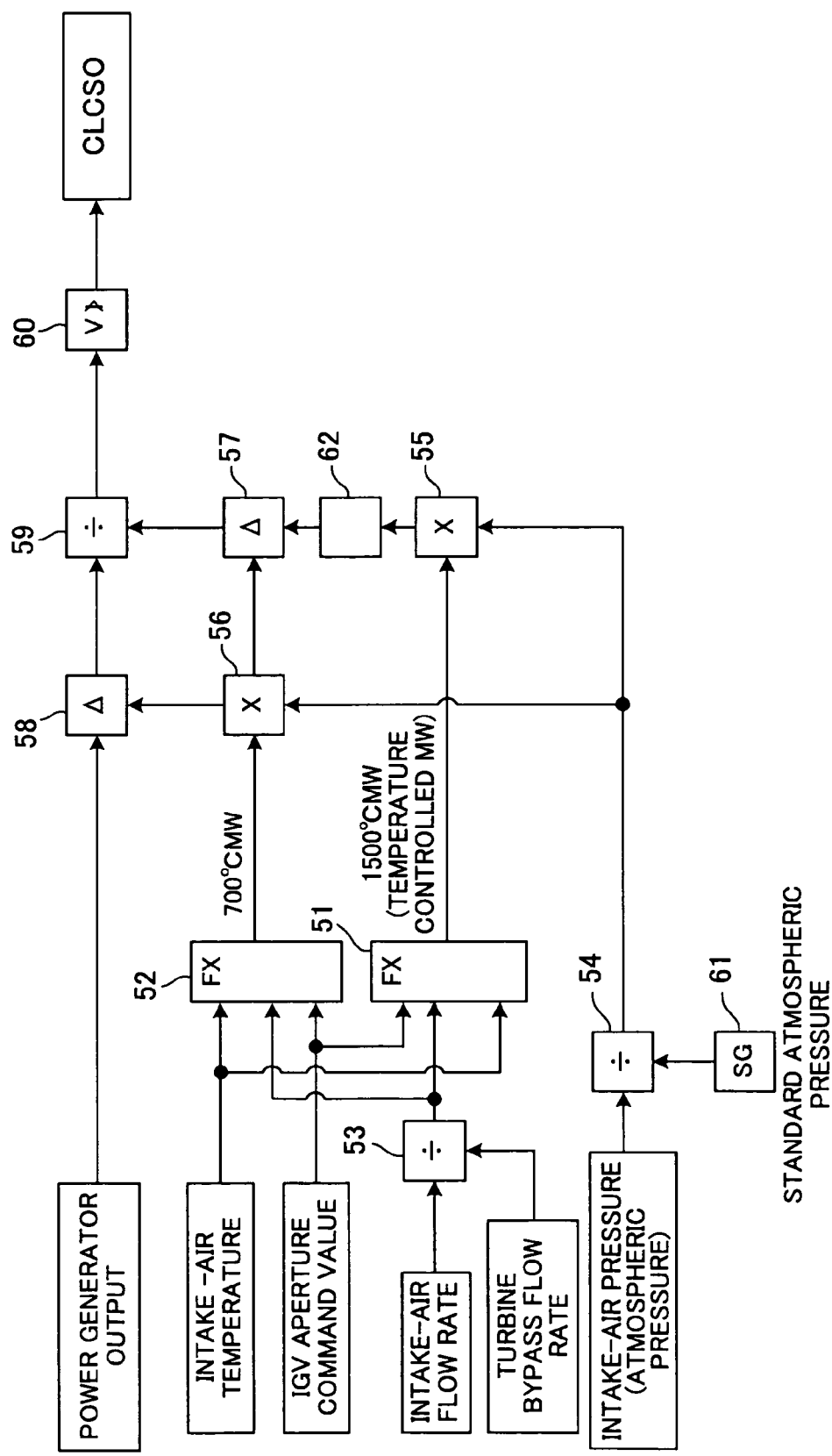
FIG. 16 is a block diagram showing a configuration of computation logic of the CLCSO in the combustion control device for a gas turbine.

Now, an explanation will be made based on computation logic of the CLCSO (combustion load command computing means) shown in FIG. 16. First, a function generator 51 as second gas turbine output computing means computes the 1500° C. MW value (the temperature controlled MW) as a second gas turbine output based on an actual measurement value of the intake-air temperature, the IGV aperture command value, and the turbine bypass ratio (a turbine bypass flow rate/intake-air flow rate) calculated by dividing an actual measurement value of a turbine bypass flow rate by an actual measurement value of an intake-air flow rate (corresponding to a total amount of the compressed air) with a divider 53. That is, the 1500° C. MW value is calculated while considering the IGV aperture, the intake-air temperature, and the turbine bypass ratio. The method of computing this 1500° C. MW value has been described previously.

A function generator 52 as first gas turbine output computing means computes the 700° C. MW value as a first gas turbine output based on the intake-air temperature, the IGV aperture command value, and the turbine bypass ratio. That is, the 700° C. MW value is calculated while considering the IGV aperture, the intake-air temperature, and the turbine bypass ratio. The method of computing this 700° C. MW value is similar to the case of computing the 1500° C. MW value.

A divider 54 calculates the atmospheric pressure ratio (intake-air pressure/standard atmospheric pressure) by dividing an actual measurement value of an intake-air pressure (the atmospheric pressure) by the standard atmospheric pressure set up with a signal generator 61. A multiplier 55 multiplies the 1500° C. MW value calculated with the function generator 51 by the atmospheric pressure ratio calculated with the divider 54, to calculate the 1500° C. MW value in consideration of the atmospheric pressure ratio as well. The 1500° C. MW value calculated with the multiplier 55 is outputted to a subtracter 57 through a learning circuit 62 functioning as learning means. Details of the leaning circuit 62 will be described later. A multiplier 56 multiplies the 700° C. MW value calculated with the function generator 52 by the atmospheric pressure ratio calculated with the divider 54 to calculate the 700° C. MW value in consideration of the atmospheric pressure ratio as well.

The subtracter 57 subtracts the 700° C. MW value calculated with the multiplier 56 from the 1500° C. MW value calculated with the multiplier 55 (or corrected by the learning circuit 62) (1500° C. MW-700° C. MW: see the formula (1)). A subtracter 58 subtracts the 700° C. MW value calculated with the multiplier 56 from the actual measurement value of the power generator output (the gas turbine output) (the actual measurement value of the power generator output (the gas turbine output) 700° C. MW: see the formula (1)).

Thereafter, a divider 59 divides a result of subtraction with the subtracter 58 by a result of subtraction with the subtracter 57 (see the formula (1)). In this way, it is possible to compute the CLCSO. Here, to express the CLCSO in percentage, an output value from the divider 59 should be multiplied by 100. A rate setter 60 outputs an inputted value from the divider 59 while restricting the value to a given rate of change instead of directly outputting the inputted value as the CLCSO in order to avoid the main fuel flow rate control valve 17 and the like from frequently repeating opening and closing operations caused by a small variation in the CLCSO attributable to a small variation in the gas turbine output (the power generator output) or the like.

Incidentally, when the gas turbine 1 is operated for a long period, deterioration in the performance of the gas turbine 1 may be caused by deterioration in a compression performance of the compressor 4 and the like. As a consequence, the power generator output (the gas turbine output) starts declining. That is, in this case, the power generator output (the gas turbine output) does not reach the given (such as a rated) power generator output (gas turbine output) as shown in FIG. 10 even when the combustion gas temperature TIT at the inlet of the gas turbine reaches 1500° C. As a result, the CLCSO may also decline and the relation between the CLCSO and the combustion gas temperature TIT at the inlet of the gas turbine may be deviated. Accordingly, the relations of the combustion gas temperature TIT at the inlet of the gas turbine with the pilot ratio, the top hat ratio, the main ratio, and the aperture of the combustor bypass valve will be also deviated. Therefore, it is necessary to reduce the value of 1500° C. MW (the temperature controlled MW) for computing the CLCSO as well.

Figure 17:
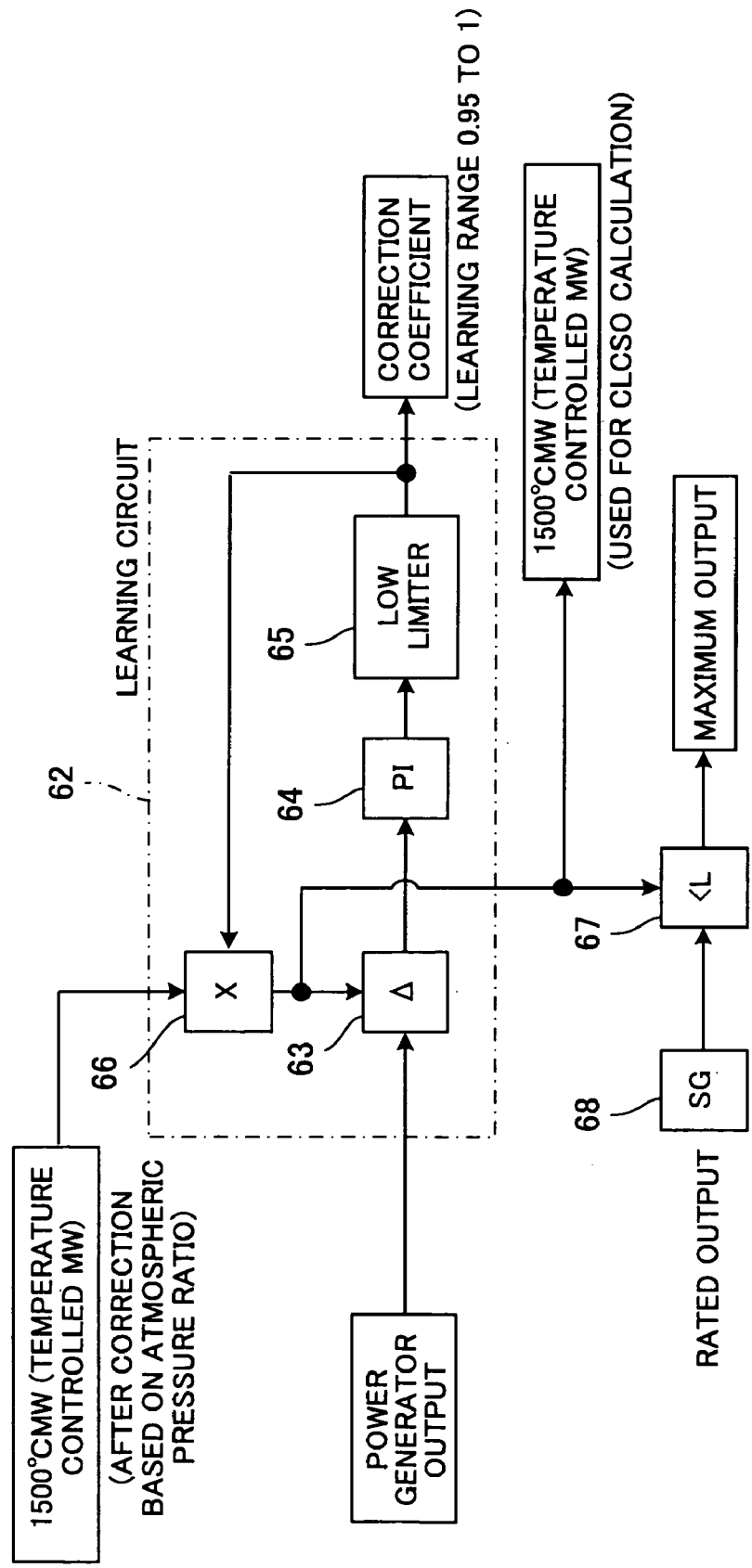
FIG. 17 is a block diagram showing a configuration of a learning circuit for a temperature regulated MW in the combustion control device for a gas turbine.

For this reason, in the gas turbine combustion control device 41, the computation logic of the CLCSO also includes the learning circuit 62 for 1500° C. MW value (the temperature controlled MW) as shown in FIG. 17.

Figure 18:
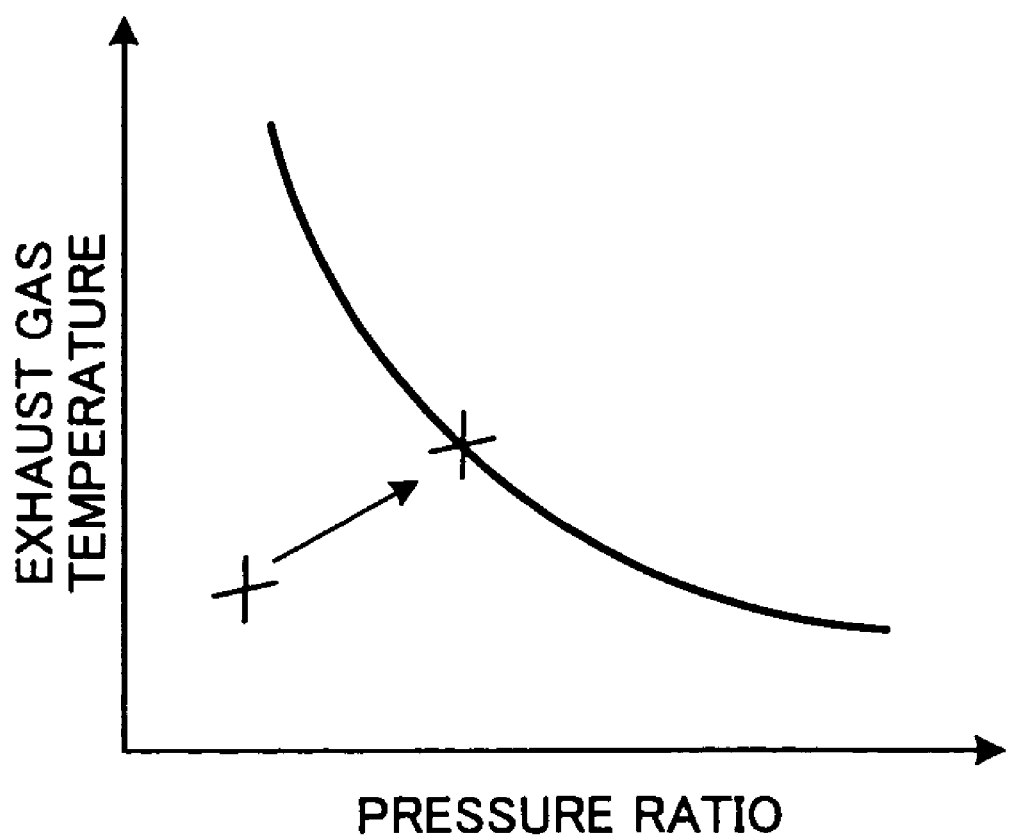
FIG. 18 is a graph showing a relation between a pressure ratio of a compressor and an exhaust-gas temperature.

The learning circuit 62 firstly judges whether or not the combustion gas temperature TIT at the inlet of the gas turbine reaches the maximum combustion gas temperature (1500° C.) before starting to learn the 1500° C. MW value (the temperature controlled MW) in order to judge whether or not a decline in the power generator output (the gas turbine output) is attributable to deterioration in characteristics of the gas turbine 1. Specifically, when the combustion gas temperature TIT at the inlet of the gas turbine is equal to the maximum combustion gas temperature (1500° C.), there is a relation between a pressure ratio of the compressor 4 (a ratio between a pressure on an inlet side and a pressure on an outlet side of the compressor 4) and the exhaust gas temperature as shown in FIG. 18. Therefore, the learning circuit 62 monitors a pressure ratio (the cylinder pressure/the intake-air pressure) of the compressor 4 obtained from the actual measurement value of the intake-air pressure and the actual measurement value of the cylinder pressure as well as the actual measurement value of the exhaust gas temperature. Moreover, the learning circuit 62 judges that the combustion gas temperature TIT at the inlet of the gas turbine reaches the maximum combustion gas temperature (1500° C.) when the pressure ratio and the exhaust gas temperature satisfy the relation shown in FIG. 18, and then starts learning.

In this case, the learning circuit 62 firstly calculates a deviation (the power generator output—1500° C.) between the 1500° C. MW value (the temperature controlled MW) after correction in terms of the atmospheric pressure to be inputted from the multiplier 55 in the computation logic of the CLCSO shown in FIG. 16 and the actual measurement value of the gas turbine output (the power generator output) by use of a subtracter (a deviation operator) 63. A PI (proportion and integration) controller 64 calculates a correction coefficient by subjecting the deviation calculated with the subtracter (the deviation operator) 63 to proportional and integral operations. A LOW limiter 65 limits the correction coefficient (ranging from 0 to 1) operated with the PI operator 64 to a range from 0.95 to 1. The reason for providing the limited range of the correction coefficient as described above is to consider an amount of presumable reduction in the power generator output (the gas turbine output) by normal deterioration in the performance of the gas turbine 1 and to prevent excessive correction attributable to an abnormal drop of the output from the gas turbine 1. A multiplier 66 multiplies the correction coefficient by the 1500° C. MW value (the temperature controlled MW) inputted from the multiplier 55, and outputs a result of multiplication to the subtracter (the deviation operator) 63.

By performing the processing as described above, the 1500° C. MW value (the temperature controlled MW) is corrected so as to coincide with the actual measurement value of the gas turbine output (the power generator output). Then, the 1500° C. MW value (the temperature controlled MW) after correction is outputted to the subtracter 57 in the computation logic of the CLCSO shown in FIG. 16 for use in the calculation of the CLCSO. Here, a lower value selector 67 selects a lower value out of the 1500° C. MW value (the temperature controlled MW) after correction and the rated power generator output (the gas turbine output) set up in a signal generator 68, and outputs the selected value for monitor display and the like.

(Computation of Respective Valve Position Command Values Based on CLCSO)

Next, the processing for calculating the respective valve position command values based on the CLCSO will be described.

Figure 19:
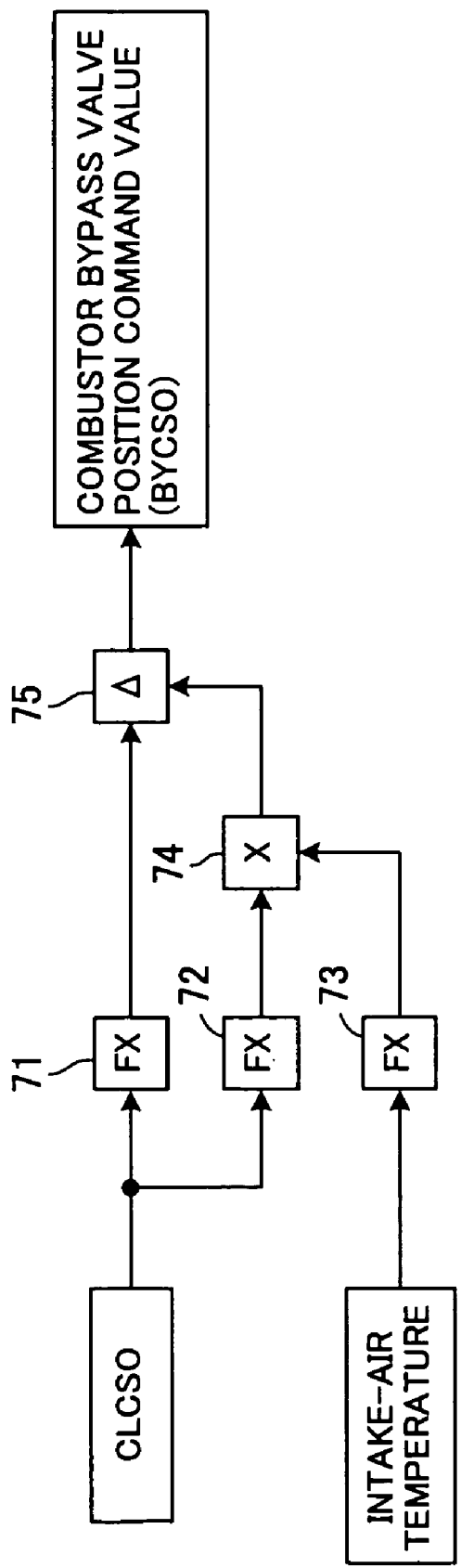
FIG. 19 is a block diagram showing a configuration of computation logic of the combustor bypass valve position command value in the combustion control device for a gas turbine.

First, computation logic of the combustor bypass valve position command value (the BYCSO) will be described with reference to FIG. 19. A function generator 71 calculates the BYCSO corresponding to the CLCSO calculated in accordance with the computation logic of the CLCSO based on the preset function of the CLCSO and the combustor bypass valve position command value (the BYCSO) as shown in FIG. 9.

Figure 20:
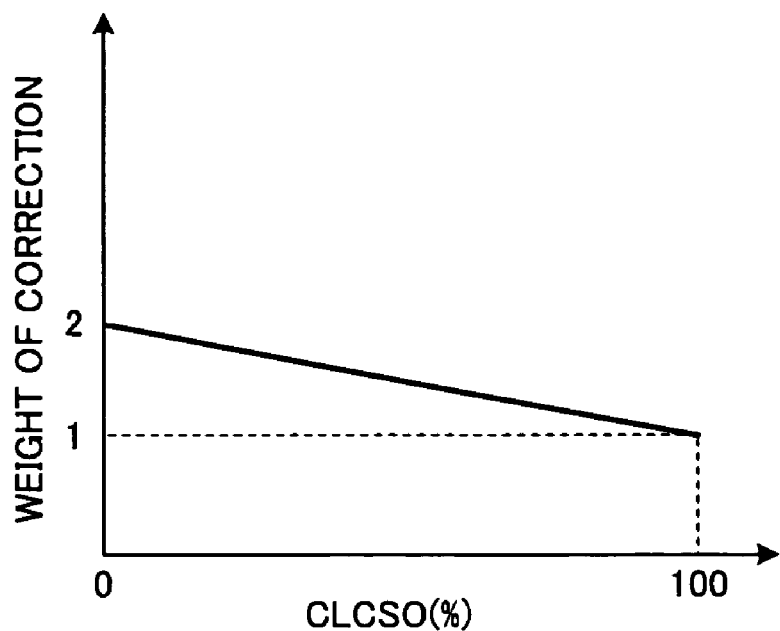
FIG. 20 is a graph showing a relation between the CLCSO and weight of intake-air temperature correction.
Figure 21:
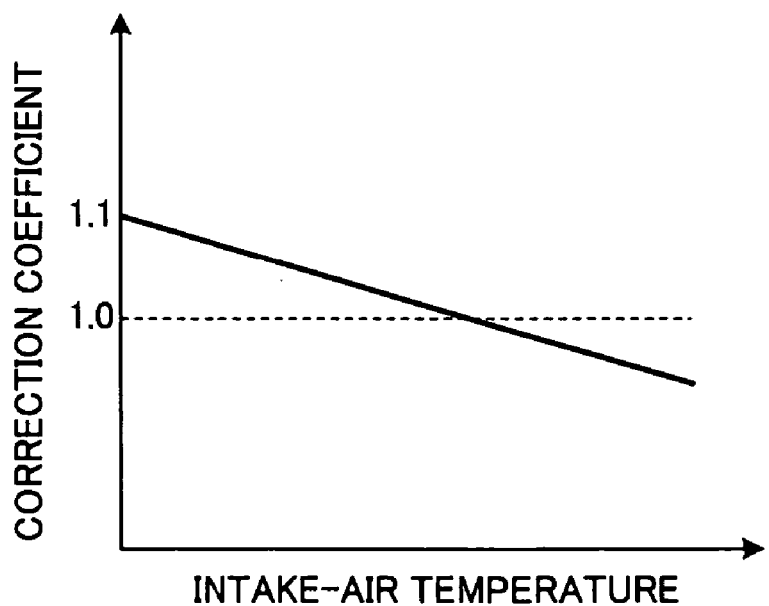
FIG. 21 is a graph showing a relation between the intake-air temperature and a correction coefficient.

Meanwhile, in this computation logic, this combustor bypass valve position command value is subjected to correction based on the CLCSO and correction based on the intake-air temperature. Specifically, a function generator 72 calculates a weight value of correction corresponding to the CLCSO calculated in accordance with the computation logic of the CLCSO based on a function of the CLCSO and the weight of correction as shown in FIG. 20, which is set up in the preliminary studies (the gas turbine designing processes). A function generator 73 calculates a correction efficient corresponding to the actual measurement value of the intake-air temperature based on a function of the intake-air temperature and the correction coefficient as shown in FIG. 21, which is set up in the preliminary studies (the gas turbine designing processes). A multiplier 74 calculates an intake-air temperature correction amount by multiplying the weight value of correction based on the CLCSO calculated with the function generator 72 by the correction coefficient based on the intake-air temperature calculated with the function generator 73. A subtracter 75 performs the intake-air temperature correction of the BYCSO by subtracting the intake-air correction amount calculated with the multiplier 74 from the BYCSO calculated with the function generator 71. That is, the function generators 72 and 73, the multiplier 74, and the subtracter 75 collectively constitute intake-air temperature correcting means.

The reason for performing the correction of the BYSCO based on the intake-air temperature is to achieve more appropriate combustion control relative to the variation in the intake-air temperature as compared to the case of determining the BYSCO simply based on the CLCSO (the combustion gas temperature at the inlet of the gas turbine). Here, the intake-air temperature correction amount may be set to a relatively large value with respect to the BYCSO without causing any problems at the time of a low load (a low gas turbine output). However, a small change in the BYCSO may cause a large change in a combustion state at the time of a high load (a high gas turbine output). Accordingly, it is necessary to reduce the intake-air temperature correction amount relative to the BYCSO. For this reason, the weight of correction is determined in response to the CLCSO (i.e. the gas turbine output) as described above, and the appropriate intake-air temperature correction amount for the BYCSO corresponding to the CLCSO is determined by multiplying this weight value by the correction coefficient which is obtained from the intake-air temperature.

Thereafter, the gas turbine combustion control device 41 controls the bypassing flow rate of the compressed air relative to the combustor 3 by regulating the aperture of the combustor bypass valve 8 based on the CLCSO calculated in accordance with this computation logic.

Figure 22:
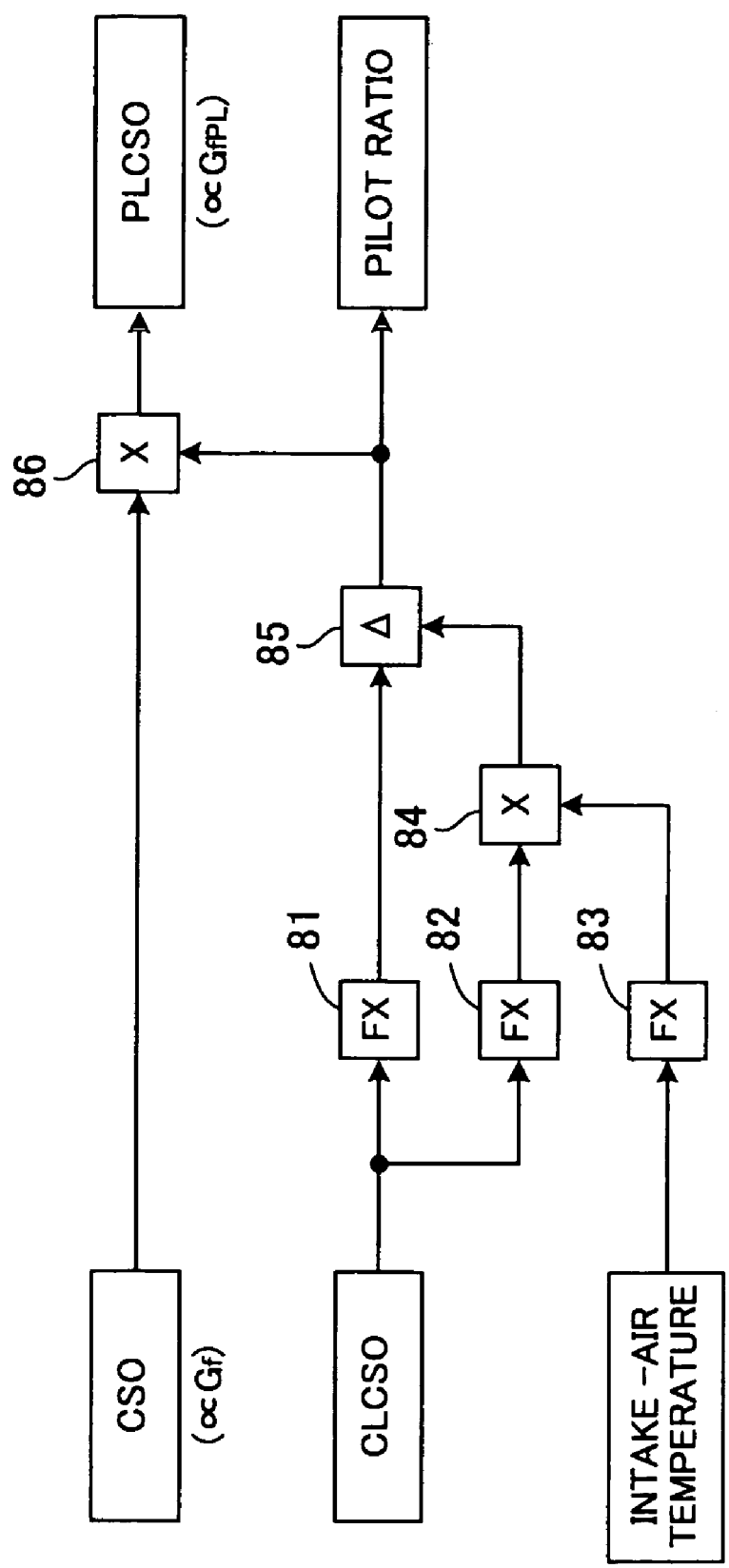
FIG. 22 is a block diagram showing a configuration of computation logic of a PLCSO in the combustion control device for a gas turbine.

Next, computation logic (fuel flow rate command setting means) of a pilot fuel flow rate command value (PLCSO) will be described with reference to FIG. 22. A function generator 81 calculates the pilot ratio corresponding to the CLCSO calculated in accordance with the computation logic of the CLCSO based on the function of the CLCSO and the pilot ratio which is set up in advance as shown in FIG. 7.

Meanwhile, in this computation logic as well, this pilot ratio is subjected to correction based on the CLCSO and correction based on the intake-air temperature. Specifically, a function generator 82 calculates a weight value of correction corresponding to the CLCSO calculated in accordance with the computation logic of the CLCSO based on the function of the CLCSO and the weight of correction as shown in FIG. 20, which is set up in the preliminary studies (the gas turbine designing processes). A function generator 83 calculates a correction efficient corresponding to the actual measurement value of the intake-air temperature based on the function of the intake-air temperature and the correction coefficient as shown in FIG. 21, which is set up in the preliminary studies (the gas turbine designing processes). A multiplier 84 calculates an intake-air temperature correction amount by multiplying the weight value of correction based on the CLCSO calculated with the function generator 82 by the correction coefficient based on the intake-air temperature calculated with the function generator 83. A subtracter 85 performs the intake-air temperature correction of the pilot ratio by subtracting the intake-air correction amount calculated with the multiplier 84 from the pilot ratio calculated with the function generator 81. That is, the function generators 82 and 83, the multiplier 84, and the subtracter 85 collectively constitute the intake-air temperature correcting means.

The reason for performing the correction of the pilot ratio based on the intake-air temperature is to achieve more appropriate combustion control relative to the variation in the intake-air temperature as compared to the case of determining the pilot ratio simply based on the CLCSO (the combustion gas temperature at the inlet of the gas turbine). Here, the intake-air temperature correction amount may be set to a relatively large value with respect to the pilot ratio without causing any problems at the time of the low load (the low gas turbine output). However, a small change in the pilot ratio may cause a large change in the combustion state at the time of the high load (i.e. the high gas turbine output). Accordingly, it is necessary to reduce the intake-air temperature correction amount relative to the pilot ratio. For this reason, the weight of correction is determined in response to the CLCSO (i.e. the gas turbine output) as described above, and the appropriate intake-air temperature correction amount for the pilot ratio corresponding to the CLCSO is determined by multiplying this weight value by the correction coefficient which is obtained from the intake-air temperature.

Thereafter, a multiplier 86 computes the PLCSO by multiplying a total fuel flow rate command value (CSO) by the pilot ratio calculated with the subtracter 85. The total fuel flow rate command value (CSO) is a value proportional to a total fuel gas flow rate (a weight flow rate) $G_f$ to be supplied to the combustor 3 (CS O$\propto G_f$). Therefore, the PLCSO is a value proportional to the pilot gas fuel flow rate $G_{fPL}$.

Here, the total fuel flow rate command value (CSO) is set up based on a relation between a power generator output command value, which is set up in advance in the preliminary studies (the gas turbine designing processes), and the CSO (i.e. the total fuel gas flow rate $G_f$. Specifically, the gas turbine combustion control device 41 sets up the total fuel flow rate command value (CSO) based on the preset relation (the function) between the power generator output command value and the CSO by use of the power generator output command value set up by the central load dispatching center or the like. Here, the gas turbine combustion control device 41 adjusts the total fuel flow rate command value (CSO) by use of an unillustrated control unit such that the actual measurement value of the power generator output coincides with the power generator output command value. For example, the total fuel flow rate command value (CSO) is adjusted such that the actual measurement value of the power generator output coincides with the power generator output command value by subjecting a deviation between the actual measurement value of the power generator output and the power generator output command value to proportional and integral operations with a PI controller.

Figure 23:
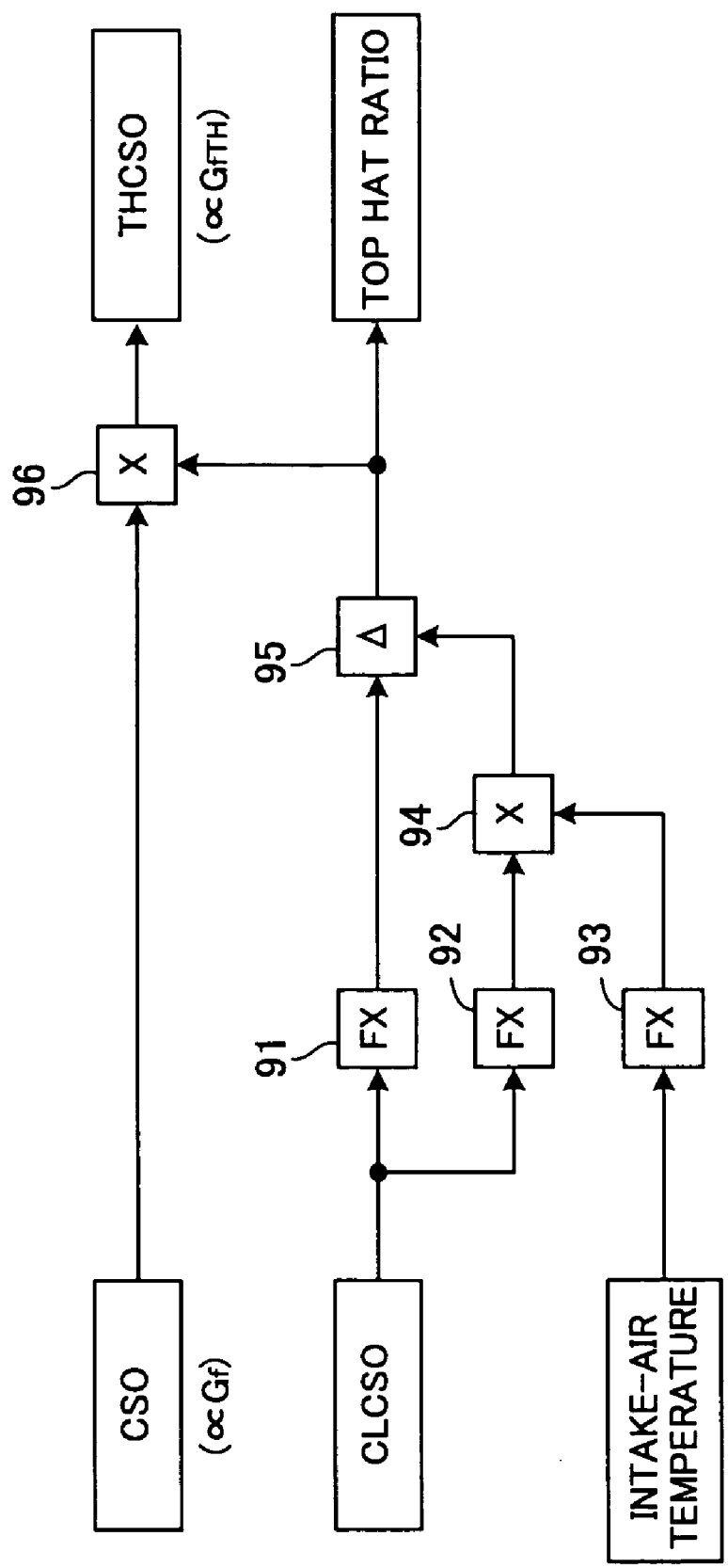
FIG. 23 is a block diagram showing a configuration of computation logic of a THCSO in the combustion control device for a gas turbine.

Next, computation logic (the fuel flow rate command setting means) of a top hat fuel flow rate command value (THCSO) will be described with reference to FIG. 23. A function generator 91 calculates the top hat ratio corresponding to the CLCSO calculated in accordance with the computation logic of the CLCSO based on the function of the CLCSO and the top hat ratio which is set up in advance as shown in FIG. 8.

Meanwhile, in this computation logic as well, this top hat ratio is subjected to correction based on the CLCSO and correction based on the intake-air temperature. Specifically, a function generator 92 calculates a weight value of correction corresponding to the CLCSO calculated in accordance with the computation logic of the CLCSO based on the function of the CLCSO and the weight of correction as shown in FIG. 20, which is set up in the preliminary studies (the gas turbine designing processes). A function generator 93 calculates a correction efficient corresponding to the actual measurement value of the intake-air temperature based on the function of the intake-air temperature and the correction coefficient as shown in FIG. 21, which is set up in the preliminary studies (the gas turbine designing processes). A multiplier 94 calculates an intake-air temperature correction amount by multiplying the weight value of correction based on the CLCSO calculated with the function generator 92 by the correction coefficient based on the intake-air temperature calculated with the function generator 93. A subtracter 95 performs the intake-air temperature correction of the top hat ratio by subtracting the intake-air correction amount calculated with the multiplier 94 from the top hat ratio calculated with the function generator 91. That is, the function generators 92 and 93, the multiplier 94, and the subtracter 95 collectively constitute the intake-air temperature correcting means.

The reason for performing the correction of the top hat ratio based on the intake-air temperature is to achieve more appropriate combustion control relative to the variation in the intake-air temperature as compared to the case of determining the top hat ratio simply based on the CLCSO (the combustion gas temperature at the inlet of the gas turbine). Here, the intake-air temperature correction amount may be set to a relatively large value with respect to the top hat ratio without causing any problems at the time of the low load (the low gas turbine output). However, a small change in the top hat ratio may cause a large change in the combustion state at the time of the high load (the high gas turbine output). Accordingly, it is necessary to reduce the intake-air temperature correction amount relative to the top hat ratio. For this reason, the weight of correction is determined in response to the CLCSO (i.e. the gas turbine output) as described above, and the appropriate intake-air temperature correction amount for the top hat ratio corresponding to the CLCSO is determined by multiplying this weight value by the correction coefficient which is obtained from the intake-air temperature. Although details will be described later, the main ratio is also computed based on the pilot ratio and the top hat ratio, and is therefore subjected to intake-air temperature correction.

A multiplier 96 computes the THCSO by multiplying the CSO by the top hat ratio calculated with the subtracter 95. The THCSO is proportional to the top hat gas fuel flow rate (a weight flow rate) $G_{fTH}$.

Next, computation logic of the respective flow rate control valve position command values will be described with reference to FIG. 24.

Figure 25:
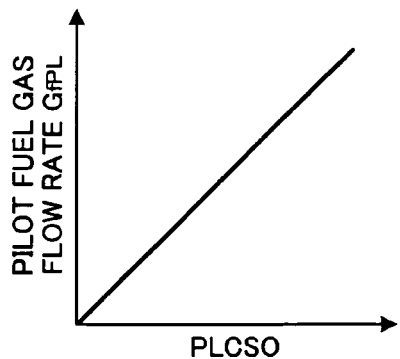
FIG. 25 is a graph showing a relation (a proportional relation) between the PLCSO and a pilot fuel gas flow rate $G_{fPL}$.

First, the computation logic of the pilot fuel flow rate control valve command value will be described. A function generator 101 computes the value of the pilot fuel flow rate $G_{fPL}$ corresponding to the PLCSO calculated with the multiplier 86 in accordance with the computation logic of the PLCSO as described above based on a function of the PLCSO and the pilot gas flow rate $G_{fPL}$ as shown in FIG. 25 as an example (fuel flow rate setting means). In other words, the PLCSO is converted into a weight flow rate Q. The function of (or a proportional relation between) the PLCSO and the pilot fuel gas flow rate $G_{fPL}$ is set up in advance in the preliminary studies (the gas turbine designing processes).

Subsequently, the Cv value of the pilot fuel flow rate control valve 19 is computed based on the following formula (2) representing a Cv value calculation formula:

$$Cv = \frac{aG}{289}\sqrt{\frac{\gamma(t+273)}{P_1^2 - P_2^2}} \quad (2)$$
$$a = \frac{1}{\gamma_N} \cdot \frac{273 + 15.6}{273}$$

In the formula (2), reference code t denotes the temperature of the pilot fuel gas flowing on the pilot fuel flow rate control valve 19. A value measured with the fuel gas thermometer Tf is applied to this pilot fuel gas temperature. Reference code $\gamma$ denotes a gas density ratio relative to the air, which is a preset value. Reference code G denotes the pilot fuel gas flow rate (the weight flow rate) flowing on the pilot fuel flow rate control valve 19. The pilot fuel gas flow rate $G_{fPL}$ calculated with the function generator 101 is applied to this pilot fuel gas flow rate. Reference code a denotes a coefficient used for converting the pilot fuel gas flow rate G into a volume flow rate (m³/h) at 15.6° C. and at 1 ata. The coefficient a is a preset value. Reference code $\gamma_N$ denotes gas density in a normal state.

Moreover, in the formula (2), reference code $P_2$ denotes a back pressure (a pressure on a downstream side) of the pilot fuel flow rate control valve 19. A measurement value or a corrected value (to be described later in detail) of the pilot manifold pressure gauge PX2 is applied to this back pressure. Reference code $P_1$ denotes a front pressure (a pressure on an upstream side) of the pilot fuel flow rate control valve 19. A value obtained by adding a front-to-back differential pressure of the pilot fuel flow rate control valve 19 (such as 4 kg/cm²) to the measurement value of the pilot manifold pressure gauge PX2 is applied to this front pressure. This front-to-back differential pressure is adjusted to be a constant value by use of the pilot fuel pressure control valve 18. It is to be noted, however, that the present invention will not be limited only to this configuration. It is possible to apply a measurement value of the pilot fuel differential pressure gauge PDX2 to the front-to-back differential pressure. Alternatively, when the front pressure of the pilot fuel flow rate control valve 19 is measured with a pressure gauge, it is possible to apply the measurement value of that pressure gauge to the $P_1$ value.

In terms of explanation based on the computation logic, a function generator 102 performs a calculation in accordance with the following formula (3) based on the pilot manifold pressure (used as the back pressure $P_2$), which is either the actual measurement value or the corrected value using manifold pressure correction logic 130 (to be described later in detail) functioning as pressure correcting means:

$$\frac{1}{\sqrt{(4+P_2)^2 - P_2^2}} \quad (3)$$

A function generator 103 performs a calculation in accordance with the following formula (4) based on the fuel gas temperature (used as the pilot fuel gas temperature t), which is either an actual measurement value inputted by use of fuel gas temperature correction logic 120 (to be described later in detail) functioning as fuel temperature correcting means, or a constant value:

$$\frac{a\sqrt{\gamma(t+273)}}{289} \quad (4)$$

Figure 26:
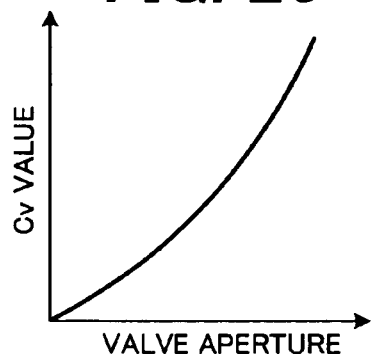
FIG. 26 is a graph showing a relation between a valve aperture and a Cv value.

A multiplier 104 multiplies the pilot fuel gas flow rate $G_{fPL}$ (used as the pilot fuel gas flow rate G) calculated with the function generator 101 by a result of calculation with the function generator 102, and then by a result of calculation with the function generator 103. In this way, the calculation of the above-described formula (2) is completed and the Cv value of the pilot fuel flow rate control valve 19 is obtained (Cv value setting means). A function generator 105 calculates an aperture of the pilot fuel flow rate control valve corresponding to the Cv value of the pilot fuel flow rate control valve 19 calculated with the multiplier 104 based on a function of the aperture of the pilot fuel flow rate control valve and the Cv value as shown in FIG. 26, which is set up in advance in the preliminary studies (specifications of the control valve). Then, the aperture of the pilot fuel flow rate control valve is outputted as the pilot fuel flow rate control valve position command value (fuel flow rate control valve position command setting means).

Thereafter, the gas turbine combustion control device 41 controls the pilot fuel gas flow rate by regulating the aperture of the pilot fuel flow rate control valve 19 based on the pilot fuel flow rate control valve position command value calculated in accordance with this computation logic.

Figure 27:
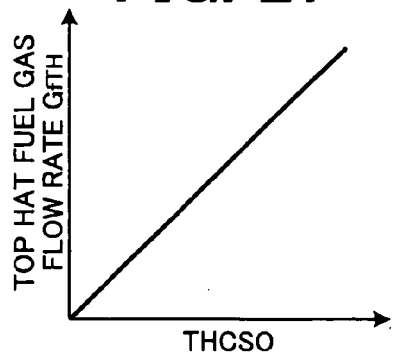
FIG. 27 is a graph showing a relation (a proportional relation) between the THCSO and a top hat fuel gas flow rate $G_{fTH}$.

Now, the computation logic of the top hat fuel flow rate control valve command value will be described. A function generator 106 computes the value of the top hat fuel gas flow rate $G_{fTH}$ corresponding to the THCSO calculated with the multiplier 96 in accordance with the computation logic of the THCSO as described above based on a function of the THCSO and the top hat fuel gas flow rate $G_{fTH}$ as shown in FIG. 27 as an example (the fuel flow rate setting means). In other words, the THCSO is converted into a flow rate Q. The function of (or a proportional relation between) the THCSO and the top hat fuel gas flow rate $G_{fTH}$ is set up in advance in the preliminary studies (the gas turbine designing processes).

Subsequently, the Cv value of the top hat fuel flow rate control valve 21 is computed based on the above-described formula (2) (the Cv value calculation formula). In terms of the formula (2) in this case, however, it is to be noted that the reference code t denotes the temperature of the top hat fuel gas flowing on the top hat fuel flow rate control valve 21. The value measured with the fuel gas thermometer Tf is applied to this top hat fuel gas temperature. The reference code G denotes the top hat fuel gas flow rate (the weight flow rate) flowing on the top hat fuel flow rate control valve 21. The top hat fuel gas flow rate $G_{fTH}$ calculated with the function generator 106 is applied to this top hat fuel gas flow rate. The reference code a denotes a coefficient used for converting the top hat fuel gas flow rate G into a volume flow rate (m$^3$/h) at 15.6° C. and at 1 ata.

Moreover, in the formula (2), the reference code $P_2$ denotes a back pressure (a pressure on a downstream side) of the top hat fuel flow rate control valve 21. A measurement value or a corrected value (to be described later in detail) of the top hat manifold pressure gauge PX3 is applied to this back pressure. The reference code $P_1$ denotes a front pressure (a pressure on an upstream side) of the top hat fuel flow rate control valve 21. A value obtained by adding a front-to-back differential pressure of the top hat fuel flow rate control valve 21 (such as 4 kg/cm$^2$) to the measurement value of the top hat manifold pressure gauge PX3 is applied to this front pressure. This front-to-back differential pressure is adjusted to be a constant value by use of the top hat fuel pressure control valve 20. It is to be noted, however, that the present invention will not be limited only to this configuration. It is possible to apply a measurement value of the top hat fuel differential pressure gauge PDX3 to the differential pressure. Alternatively, when the front pressure of the top hat fuel flow rate control valve 21 is measured with a pressure gauge, it is possible to apply the measurement value of that pressure gauge to the $P_1$ value.

In terms of explanation based on the computation logic, a function generator 107 performs the calculation in accordance with the above-described formula (3) based on the top hat manifold pressure (used as the back pressure $P_2$), which is either the actual measurement value or the corrected value using manifold pressure correction logic 140 (to be described later in detail) functioning as the pressure correcting means. The function generator 103 performs the calculation in accordance with the above-described formula (4) based on an actual measurement value of the fuel gas temperature (used as the top hat fuel gas temperature t) (as similar to the case of calculating the Cv value of the pilot fuel flow rate control valve 19).

A multiplier 109 multiplies the top hat fuel gas flow rate $G_{fTH}$ (used as the top hat fuel gas flow rate G) calculated with the function generator 106 by a result of calculation with the function generator 107, and then by a result of calculation with the function generator 103. In this way, the calculation of the above-described formula (2) is completed and the Cv value of the top hat fuel flow rate control valve 21 is obtained (the Cv value setting means). A function generator 110 calculates an aperture of the top hat fuel flow rate control valve corresponding to the Cv value of the top hat fuel flow rate control valve 21 calculated with the multiplier 109 based on the function of the aperture of the top hat fuel flow rate control valve and the Cv value as shown in FIG. 26, which is set up in advance in the preliminary studies (the specifications of the control valve). Then, the aperture of the top hat fuel flow rate control valve is outputted as the top hat fuel flow rate control valve position command value (the fuel flow rate control valve position command setting means).

Thereafter, the gas turbine combustion control device 41 controls the top hat fuel gas flow rate by regulating the aperture of the top hat fuel flow rate control valve 21 based on the top hat fuel flow rate control valve position command value calculated in accordance with this computation logic.

Now, the computation logic of the main fuel flow rate control valve command value will be described. An adder 111 adds the PLCSO calculated with the multiplier 86 of the computation logic of the PLCSO to the THCSO calculated with the multiplier 96 of the computation logic of the THCSO (PLCSO+THCSO). A subtracter 112 subtracts a result of addition with the adder 111 from the CSO (MACSO=CSO−PLCSO−THCSO) and thereby computes a main fuel flow rate command value (MACSO) (the fuel flow rate command setting means). The MACSO is proportional to the main fuel gas flow rate $G_{fMA}$.

Figure 28:
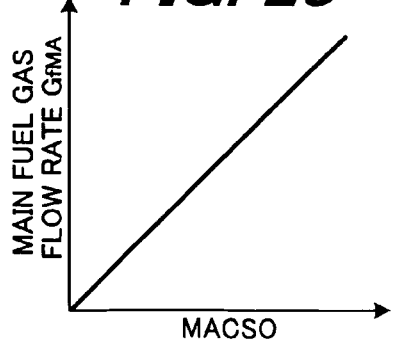
FIG. 28 is a graph showing a relation (a proportional relation) between a MACSO and a main fuel gas flow rate $G_{fMA}$.

A function generator 113 computes the value of the main fuel gas flow rate $G_{fMA}$ corresponding to the MACSO calculated with the subtracter 112 based on a function of the MACSO and the main fuel gas flow rate $G_{fMA}$ as shown in FIG. 28 as an example (the fuel flow rate setting means). In other words, the MACSO is converted into a weight flow rate Q. The function of (or a proportional relation between) the MACSO and the main fuel gas flow rate $G_{fMA}$ is set up in advance in the preliminary studies (the gas turbine designing processes).

Subsequently, the Cv value of the main fuel flow rate control valve 17 is computed based on the above-described formula (2) (the Cv value calculation formula). In terms of the formula (2) in this case, however, it is to be noted that the reference code t denotes the temperature of the main fuel gas flowing on the main fuel flow rate control valve 17. The value measured with the fuel gas thermometer Tf is applied to this main fuel gas temperature. The reference code G denotes the main fuel gas flow rate (the weight flow rate) flowing on the main fuel flow rate control valve 17. The main fuel gas flow rate $G_{fMA}$ calculated with the function generator 113 is applied to this main fuel gas flow rate. The reference code a denotes a coefficient used for converting the main fuel gas flow rate G into a volume flow rate (m$^3$/h) at 15.6° C. and at 1 ata.

Moreover, in the formula (2), the reference code $P_2$ denotes a back pressure (a pressure on a downstream side) of the main fuel flow rate control valve 17. A measurement value or a corrected value (to be described later in detail) of the main manifold pressure gauge PX1 is applied to this back pressure. The reference code $P_1$ denotes a front pressure (a pressure on an upstream side) of the main fuel flow rate control valve 17. A value obtained by adding a front-to-back differential pressure of the main fuel flow rate control valve 17 (such as 4 kg/cm$^2$) to the measurement value of the main manifold pressure gauge PX1 is applied to this front pressure. This front-to-back differential pressure is adjusted to be a constant value by use of the main fuel pressure control valve 16. It is to be noted, however, that the present invention will not be limited only to this configuration. It is possible to apply a measurement value of the main fuel differential pressure gauge PDX1 to the front-to-back differential pressure. Alternatively, when the front pressure of the main fuel flow rate control valve 17 is measured with a pressure gauge, it is possible to apply the measurement value of that pressure gauge to the $P_1$ value.

In terms of explanation based on the computation logic, a function generator 114 performs the calculation in accordance with the above-described formula (3) based on the main manifold pressure (used as the back pressure $P_2$), which is either the actual measurement value or the corrected value using manifold pressure correction logic 150 (to be described later in detail) functioning as the pressure correcting means. The function generator 103 performs the calculation in accordance with the above-described formula (4) based on an actual measurement value of the fuel gas temperature (used as the main fuel gas temperature t) (as similar to the case of calculating the Cv value of the pilot fuel flow rate control valve 19).

A multiplier 115 multiplies the main fuel gas flow rate $G_{fMA}$ (used as the main fuel gas flow rate G) calculated with the function generator 113 by a result of calculation with the function generator 114, and then by a result of calculation with the function generator 103. In this way, the calculation of the above-described formula (2) is completed and the Cv value of the main fuel flow rate control valve 17 is obtained (the Cv value setting means). A function generator 116 calculates an aperture of the main fuel flow rate control valve corresponding to the Cv value of the main fuel flow rate control valve 17 calculated with the multiplier 115 based on the function of the aperture of the main fuel flow rate control valve and the Cv value as shown in FIG. 26, which is set up in advance in the preliminary studies (the specifications of the control valve). Then, the aperture of the main fuel flow rate control valve is outputted as the main fuel flow rate control valve position command value (the fuel flow rate control valve position command setting means).

Thereafter, the gas turbine combustion control device 41 controls the main fuel gas flow rate by regulating the aperture of the main fuel flow rate control valve 17 based on the main fuel flow rate control valve position command value calculated in accordance with this computation logic.

Next, the fuel gas temperature correction logic and the manifold pressure correction logic functioning as correction logic in the event of anomalies of instruments will be described.

Figure 29:
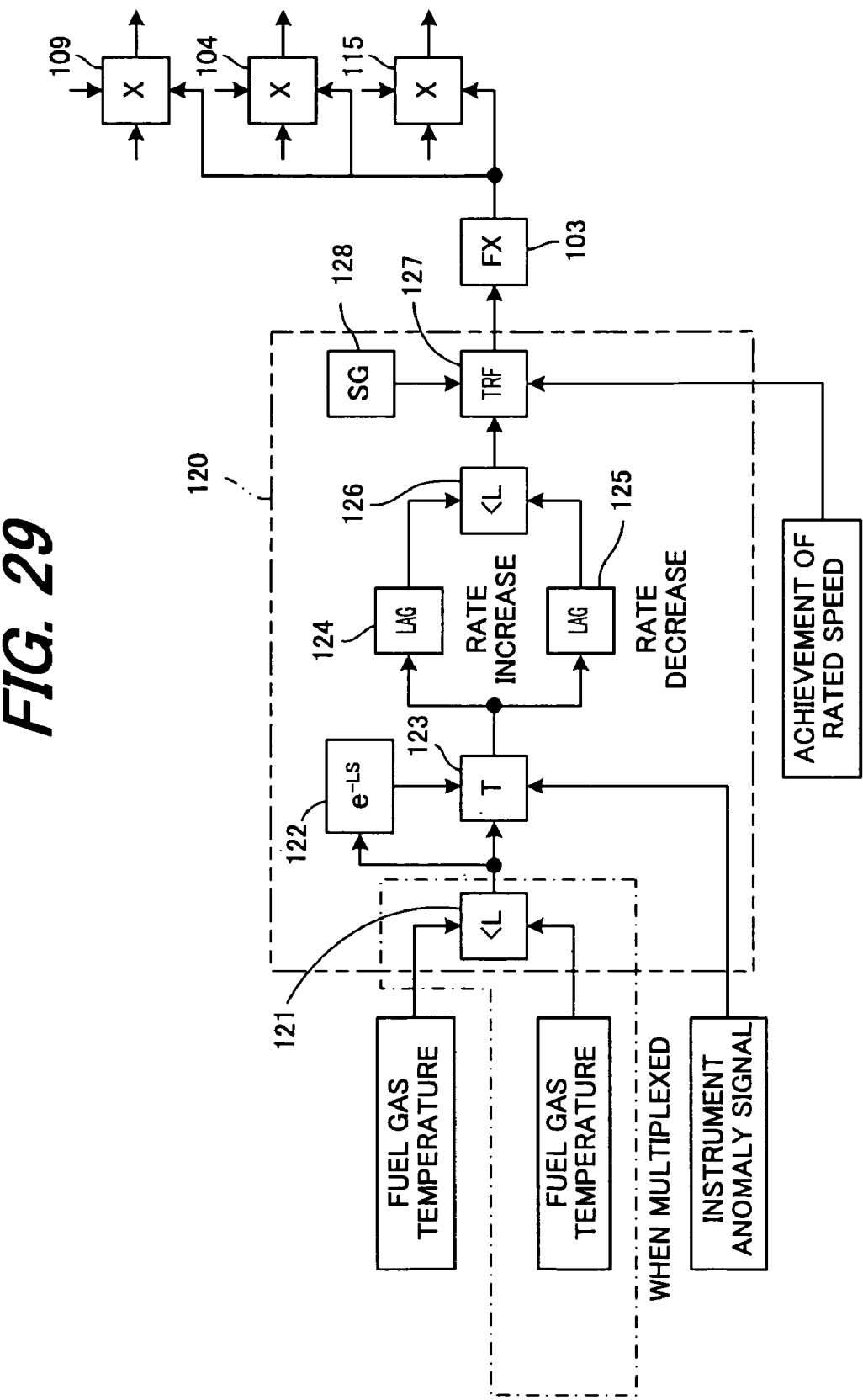
FIG. 29 is a block diagram showing a configuration of fuel gas temperature correction logic in the combustion control device for a gas turbine.

First, the fuel gas temperature correction logic will be described with reference to FIG. 29. The actual measurement value of the fuel gas temperature is inputted to a lag time setter 122 and a switch 123, respectively. Here, when the multiple fuel gas thermometers Tf are installed (when the gas thermometers Tf are multiplexed), the actual measurement value of the fuel gas temperature is inputted via a lower value selector 121. The lower value selector 121 selects and outputs the lowest value out of the values measured by the multiple fuel gas thermometers Tf (two thermometers in the illustrated example).

The lag time setter 122 outputs the actual measurement value of the fuel gas temperature, which is inputted from the fuel gas thermometer Tf, after passage of predetermined lag time L since the actual measurement value is inputted. When an instrument anomaly signal is not inputted from an instrument anomaly detection device (not shown) for detecting an anomaly of the fuel gas thermometer Tf attributable to disconnection or the like, the switch 123 usually outputs the actual measurement value of the fuel gas temperature which is inputted from the fuel gas thermometer Tf (inputted directly without interposing the lag time setter 122). On the contrary, if the instrument anomaly signal is inputted, the switch 123 changes a route to the lag time setter 122, and outputs the inputted value through this lag time setter 122. Here, the output value from the lag time setter 122 may vary depending on the input value even after this switching operation attributable to the instrument anomaly signal. However, the switch 123 holds and continues to output the value of the fuel gas temperature inputted from the lag time setter 122 at the point of the switching operation attributable to the instrument anomaly signal. In other words, after the switching operation attributable to the instrument anomaly signal, the constant value of the fuel gas temperature is outputted from the switch 123.

The output from the switch 123 is inputted to a primary delay operator 124 functioning as a first primary delay operator and to a primary delay operator 125 functioning as a second primary delay operator, respectively. A primary delay time constant set in the primary delay operator 125 for a rate decrease is smaller than a primary delay time constant set in the primary delay operator 124 for a rate increase. The primary delay operator 124 performs a primary delay calculation in terms of the fuel gas temperature inputted from the switch 123, and the primary delay operator 125 also performs a primary delay calculation in terms of the fuel gas temperature inputted from the switch 123. Then, the lower value selector 126 selects and outputs a smaller value out of a result of operation by the primary delay operator 124 and a result of operation by the primary delay operator 125.

Figure 24:
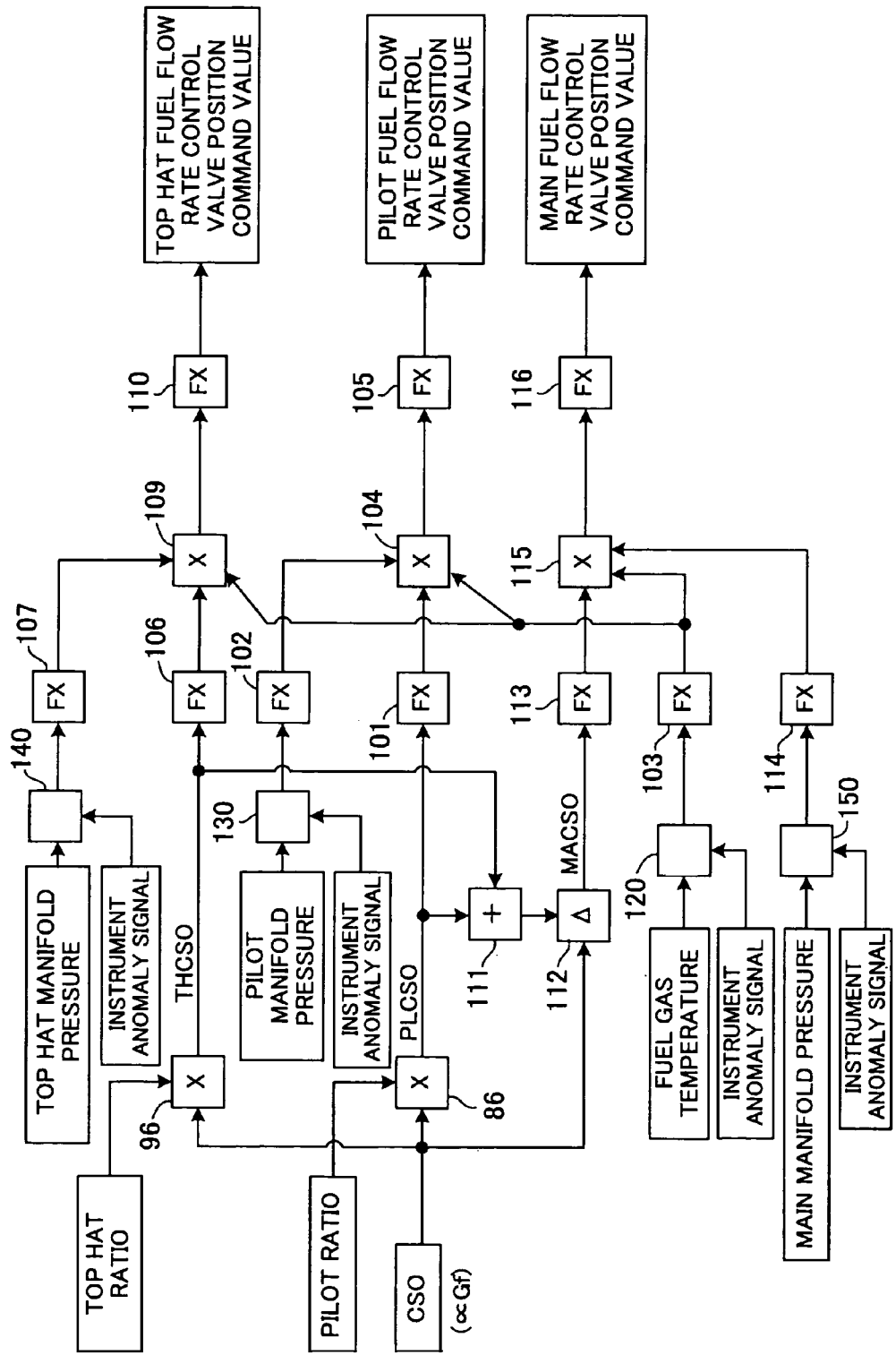
FIG. 24 is a block diagram showing a configuration of computation logic of respective fuel flow rate control valve position command values in the combustion control device for a gas turbine.

When a rated speed (rated revolution) achievement signal is not inputted from an unillustrated gas turbine revolution detection device (that is, when the gas turbine 1 is accelerating), a rating switch 127 selects the constant value of the fuel gas temperature set in a signal generator 128 and outputs the constant value to the function generator 103 of the flow rate control valve position command value computation logic shown in FIG. 24. On the contrary, when the rated speed achievement signal is inputted, the rating switch 127 selects the output of the lower value selector 126 and outputs that value to the function generator 103 of the same computation logic. Here, in order to prevent a rapid change in the fuel gas temperature, the rating switch 127 increases or decreases the output at a given rate when switching the selected signal from the output of the signal generator 128 to the output of the lower value selector 126 or vice versa.

Next, the manifold pressure correction logic will be described. As described previously, the correction of the manifold pressure takes place in terms of the pilot manifold pressure, the top hat manifold pressure, and the main manifold pressure (see the manifold pressure correction logic 130, 140 or 150 in FIG. 24). Nevertheless, the schemes of the manifold pressure correction logic 130, 140, and 150 are similar. Accordingly, individual illustration and explanation will be omitted herein, and the contents of processing in these schemes of the manifold pressure correction logic 130, 140, and 150 will be described all together.

Figure 30:
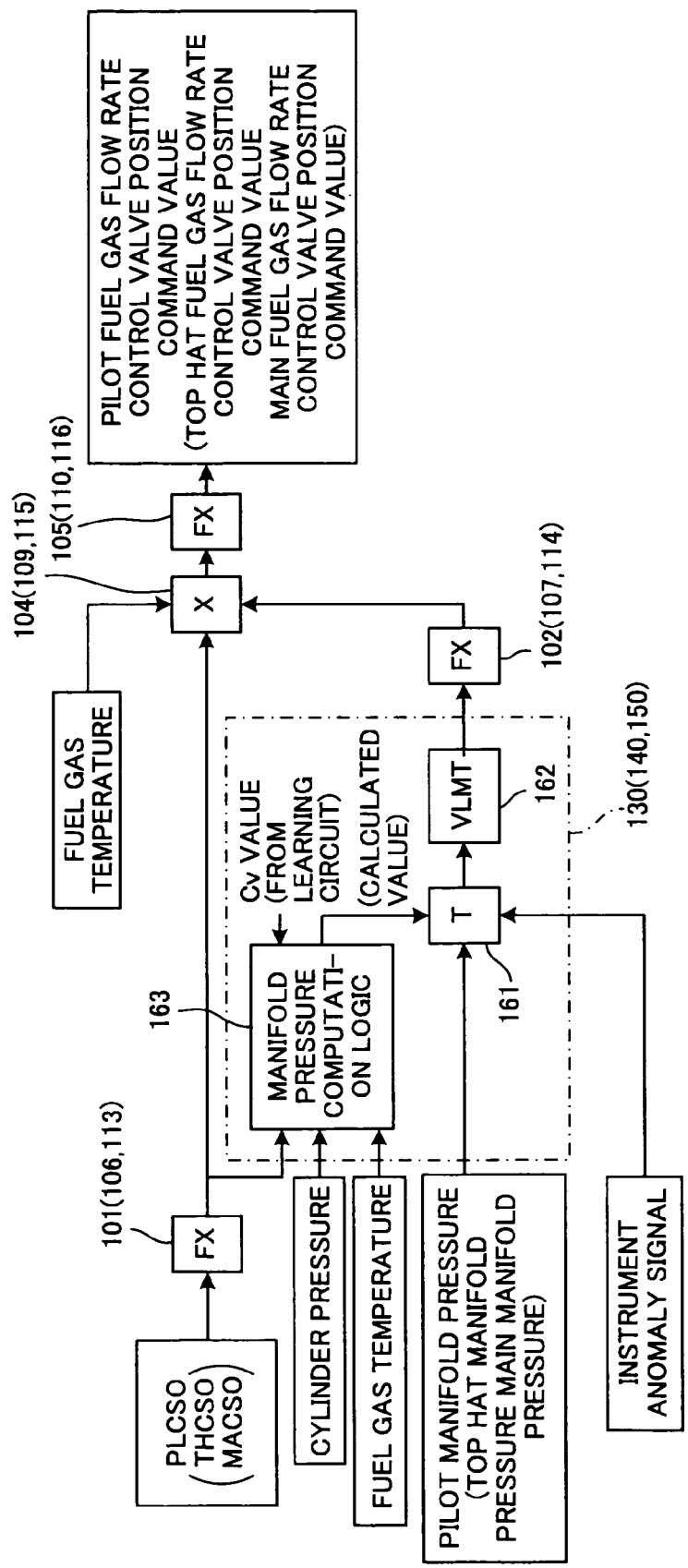
FIG. 30 is a block diagram showing a configuration of manifold pressure correction logic in the combustion control device for a gas turbine.

As shown in FIG. 30, when an instrument anomaly signal is not inputted from an instrument anomaly detection device (not shown) for detecting an anomaly of the pilot manifold pressure gauge PX2 (or any of the top hat manifold pressure gauge PX3 and the main manifold fuel differential pressure gauge PDX1) attributable to disconnection or the like, a switch 161 usually outputs the actual measurement value of pilot manifold pressure (or any of the top hat manifold pressure and the main manifold pressure) inputted from the pilot manifold pressure gauge PX2 (or any of the top hat manifold pressure gauge PX3 and the main manifold differential pressure gauge PDX1) to a change rate setter 162. On the contrary, if the instrument anomaly signal is inputted, the switch 161 changes a route to manifold pressure computation logic 163 functioning as pressure computing means, and outputs a calculated value of the pilot manifold pressure (or any of the top hat manifold pressure and the main manifold pressure) inputted from this manifold pressure computation logic 163 to the change rate setter 162.

Figure 31:
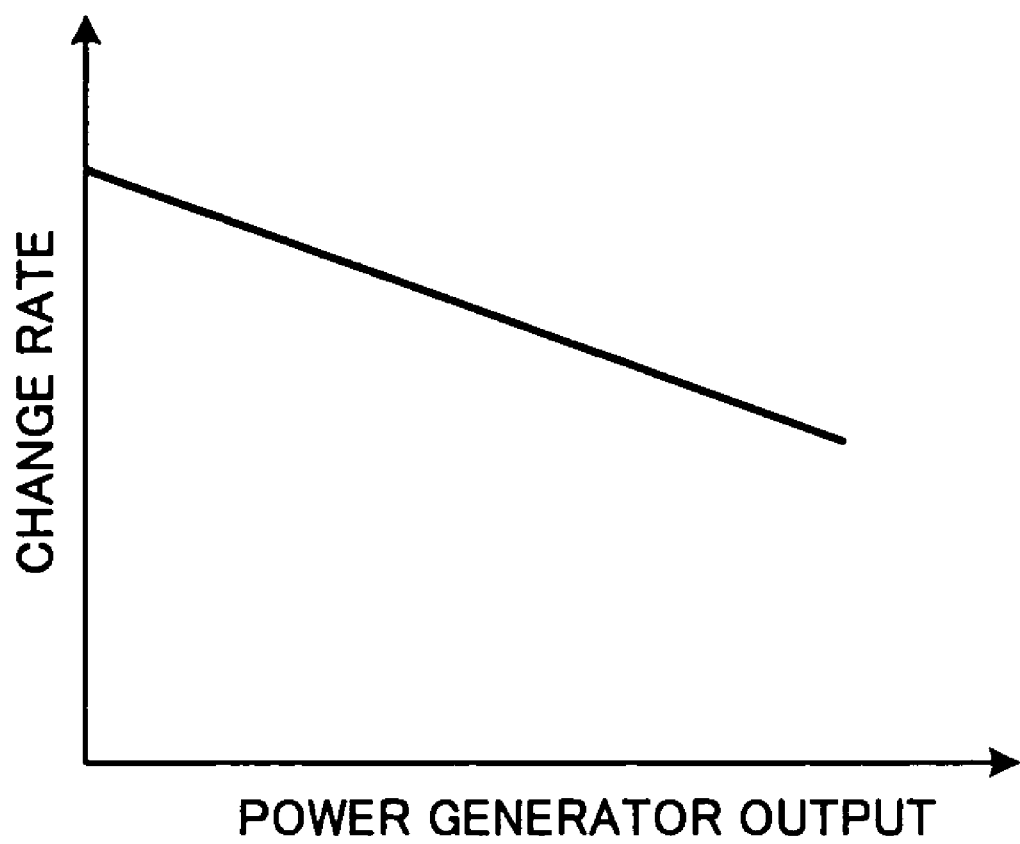
FIG. 31 is a graph showing a relation between the power generator output (the gas turbine output) and a change rate.

The change rate setter 162 sets up the change rate based on a function of the power generator output (the gas turbine output) and the change rate as shown in FIG. 31 as an example, which is set up in advance in the preliminary studies (the gas turbine designing processes) as well as based on an actual measurement value or a command value of the power generator output (the gas turbine output). Then, based on that change rate, the change rate setter 162 restricts the rate of change in terms of either the actual measurement value or the calculated value of the pilot manifold pressure (or any of the top hat manifold pressure and the main manifold pressure) to be inputted from the switch 161 and outputted to the function generator 102 (or any of the function generator 107 and the function generator 114) of the flow rate control valve position command value computation logic shown in FIG. 24.

In the case of an anomaly other than a choke, the manifold pressure computation logic 163 calculates the pilot manifold pressure (or any of the top hat manifold pressure and the main manifold pressure) based on the following formula (6) obtained by modifying the following formula (5) that represents the Cv value calculation formula for an anomaly other than a choke. Meanwhile, in the case of an anomaly attributable to a choke, the manifold pressure computation logic 163 calculates the pilot manifold pressure (or any of the top hat manifold pressure and the main manifold pressure) based on the following formula (8) obtained by modifying the following formula (7) that represents the Cv value calculation formula for an anomaly attributable to a choke.

$$Cv = \frac{aG}{289}\sqrt{\frac{\gamma(t+273)}{P_2^2 - P_3^2}} \\ a = \frac{1}{\gamma_N} \cdot \frac{273+15.6}{273}$$ (5)

$$P_2 = \sqrt{\left(\frac{aG}{289Cv} \cdot \sqrt{\gamma(t+273)}\right)^2 + P_3^2} \\ a = \frac{1}{\gamma_N} \cdot \frac{273+15.6}{273}$$ (6)

$$Cv = \frac{aG\sqrt{\gamma(t+273)}}{250P_2} \\ a = \frac{1}{\gamma_N} \cdot \frac{273+15.6}{273}$$ (7)

$$P_2 = \frac{aG}{250Cv} \cdot \sqrt{\gamma(t+273)} \\ a = \frac{1}{\gamma_N} \cdot \frac{273+15.6}{273}$$ (8)

In the formula (5) and the formula (6), reference code Cv denotes the Cv value of the pilot nozzle 25 (or any of the top hat nozzle 27 and the main nozzle 26). A preset constant value or a correction value corrected by a learning circuit (to be described later in detail) is applied to this Cv value. Reference code t denotes the temperature of the pilot fuel gas (or any of the top hat fuel gas and the main fuel gas) ejected from the pilot nozzle 25 (or any of the top hat nozzle 27 and the main nozzle 26). A value measured with the fuel gas thermometer Tf is applied to any of these fuel gas temperatures. Reference code γ denotes a gas density ratio relative to the air, which is a preset value.

Reference code G denotes the pilot fuel gas flow rate (the weight flow rate) (or any of the top hat fuel gas flow rate (the weight flow rate) and the main fuel gas flow rate (the weight flow rate)) ejected from the pilot nozzle 25 (or any of the top hat nozzle 27 and the main nozzle 26). The pilot fuel gas flow rate $G_{fPL}$ calculated with the function generator 101 (or any of the top hat fuel gas flow rate $G_{fTH}$ calculated with the function generator 106 and the main fuel gas flow rate $G_{fMA}$ calculated with the function generator 113) of the flow rate control valve position command value computation logic in FIG. 24 is applied to any of these fuel gas flow rates.

Note that the pilot fuel gas flow rate $G_{fPL}$ (or any of the top hat fuel gas flow rate $G_{fTH}$ and the main fuel gas flow rate $G_{fMA}$) represents the total pilot fuel gas flow rate $G_{fPL}$ (or any of the total top hat fuel gas flow rate $G_{fTH}$ and the total main fuel gas flow rate $G_{fMA}$). A result of distribution of the relevant fuel gas flow rate to the respective pilot nozzles 25 (or any of the respective top hat nozzles 27 and the respective main nozzles 26) is equivalent to the fuel gas flow rate of each of the pilot nozzles 25 (or any of each of the top hat nozzles 27 and each of the main nozzles 26). Therefore, a value obtained by dividing the pilot fuel gas flow rate $G_{fPL}$ (or any of the top hat fuel gas flow rate $G_{fTH}$ and the main fuel gas flow rate $G_{fMA}$) by the number of the pilot nozzles 25 (or any of the top hat nozzles 27 and the main nozzles 26) is used as the pilot fuel gas flow rate (or any of the top hat fuel gas flow rate and the main fuel gas flow rate) G of each of the pilot nozzles 25 (or any of each of the top hat nozzles 27 and each of the main nozzles 26). Reference code a denotes a coefficient used for converting any of these fuel gas flow rates G into a volume flow rate ($m^3$/h) at 15.6° C. and at 1 ata. The coefficient a is a preset value. Reference code γN denotes gas density in a normal state.

Moreover, in the formula (5) and formula (6), reference code $P_3$ denotes a back pressure (a pressure on a downstream side) of the pilot nozzle 25 (or any of the top hat nozzle 27 and the main nozzle 26). A measurement value of the cylinder pressure gauge PX5 is applied to this back pressure (see FIG. 3). Reference code $P_2$ denotes a front pressure (a pressure on an upstream side) of the pilot nozzle 25 (or any of the top hat nozzle 27 and the main nozzle 26), i.e. the pilot manifold pressure (or any of the top hat manifold pressure and the main manifold pressure).

Figure 32:
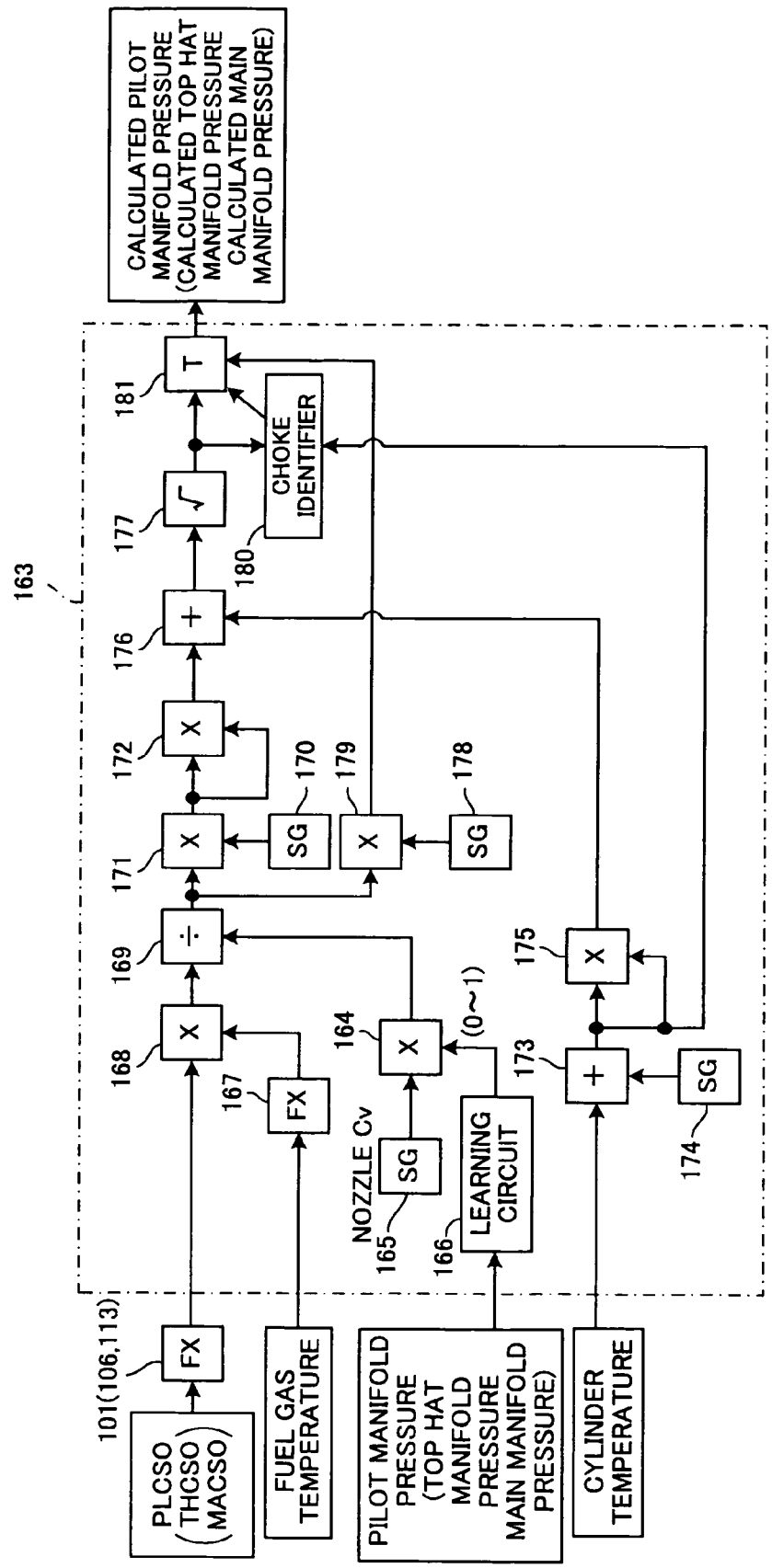
FIG. 32 is a block diagram showing a configuration of computation logic of a manifold pressure in the combustion control device for a gas turbine.

In terms of explanation based on computation logic shown in FIG. 32, a multiplier 164 multiplies the Cv value (the constant value) of the pilot nozzle 25 (or any of the top hat nozzle 27 and the main nozzle 26) preset in a signal generator 165 by a correction coefficient (to be described later in detail) calculated by the learning circuit 166 as learning means. A function generator 167 performs a calculation in accordance with the following formula (9) based on the actual measurement value of the fuel gas temperature (any one of the pilot fuel gas temperature t, the top hat fuel gas temperature t, and the main fuel gas temperature t). A multiplier 168 multiplies the pilot fuel gas flow rate G (or any of the top hat fuel gas flow rate G and the main fuel gas flow rate G), which is obtained based on the pilot fuel gas flow rate $G_{fPL}$ calculated with the function generator 101 (or any of the top hat fuel gas flow rate $G_{fTH}$ calculated with the function generator 106 and the main fuel gas flow rate $G_{fMA}$ calculated with the function generator 113) of the flow rate control valve position command value computation logic in FIG. 24, by a result of calculation with the function generator 164. A divider 169 divides a result of multiplication with the multiplier 168 by a result of multiplication with the multiplier 164.

$$\sqrt{\gamma(t+273)}$$ (9)

A multiplier 171 multiplies a result of division with the divider 169 by a value obtained by the following formula (10) which is set in a signal generator 170:

$$\frac{1}{\gamma_N} \cdot \frac{273+15.6}{273} \cdot \frac{1}{289}$$ (10)

A multiplier 172 multiplies a result of multiplication with the multiplier 171 by the same value (i.e., the multiplier 172 calculates a square of the result of multiplication with the multiplier 171). An adder 173 adds the value (1.0332) set in a signal generator 174 to the actual measurement value of the cylinder pressure (used as the back pressure $P_2$ of the pilot nozzle, the top hat nozzle or the main nozzle) and forms the cylinder pressure being the measurement value of the cylinder pressure gauge PX5 into an absolute pressure. A multiplier 175 multiplies a result of addition with the adder 173 by the same value (i.e., the multiplier 175 calculates a square of the cylinder pressure $P_2$). An adder 176 adds a result of multiplication with the multiplier 172 to a result of multiplication with the multiplier 175. That is, a calculation in accordance with the following formula (11) is completed by the time of the processing with this adder 176. Then, a rooter 177 calculates a root of a result of addition with the adder 176. That is, the calculation in accordance with the above-described formula (6) is completed by the time of the processing with this rooter 177. In this way, a calculated value $P_2$ in terms of the pilot manifold pressure (or any of the top hat manifold pressure and the main manifold pressure) in the case of an anomaly other than a choke is obtained.

$$\left(\frac{aG}{289C_V} \cdot \sqrt{\gamma(t+273)}\right)^2 + P_3^2 \quad (11)$$

Meanwhile, a multiplier 179 multiplies the result of division by the above-described divider 169 by a value obtained by the following formula (12) which is set in a signal generator 178. That is, the calculation in accordance with the above-described formula (8) is completed by the time of the processing with this multiplier 179. In this way, the calculated value $P_2$ in terms of the pilot manifold pressure (or any of the top hat manifold pressure and the main manifold pressure) in the case of an anomaly attributable to a choke is obtained.

$$\frac{1}{\gamma_N} \cdot \frac{273+15.6}{273} \cdot \frac{1}{250} \quad (12)$$

A choke identifier 180 compares the pilot manifold pressure (or any of the top hat manifold pressure and the main manifold pressure) $P_2$ that is the output of the rooter 177 with the cylinder pressure (the back pressure of any of the pilot nozzle, the top hat nozzle, and the main nozzle) $P_3$ that is the output of the adder 173, and identifies a choke when the condition as defined in the following formula (13) is satisfied:

$$P_3 \leq \frac{1}{2} P_2 \quad (13)$$

A switch 181 selects the output value of the multiplier 179 when the choke identifier 180 identifies the choke, and outputs that value to the switch 161 in FIG. 30 as the calculated pilot manifold pressure (or any of the calculated top hat manifold pressure and the calculated main manifold pressure) $P_2$. On the contrary, the switch 181 selects the output value of the rooter 177 when the choke identifier 180 does not identify the choke (in the case of an anomaly other than a choke), and outputs that value to the switch 161 in FIG. 30 as the calculated pilot manifold pressure (or any of the calculated top hat manifold pressure and the calculated main manifold pressure) $P_2$.

Figure 33:
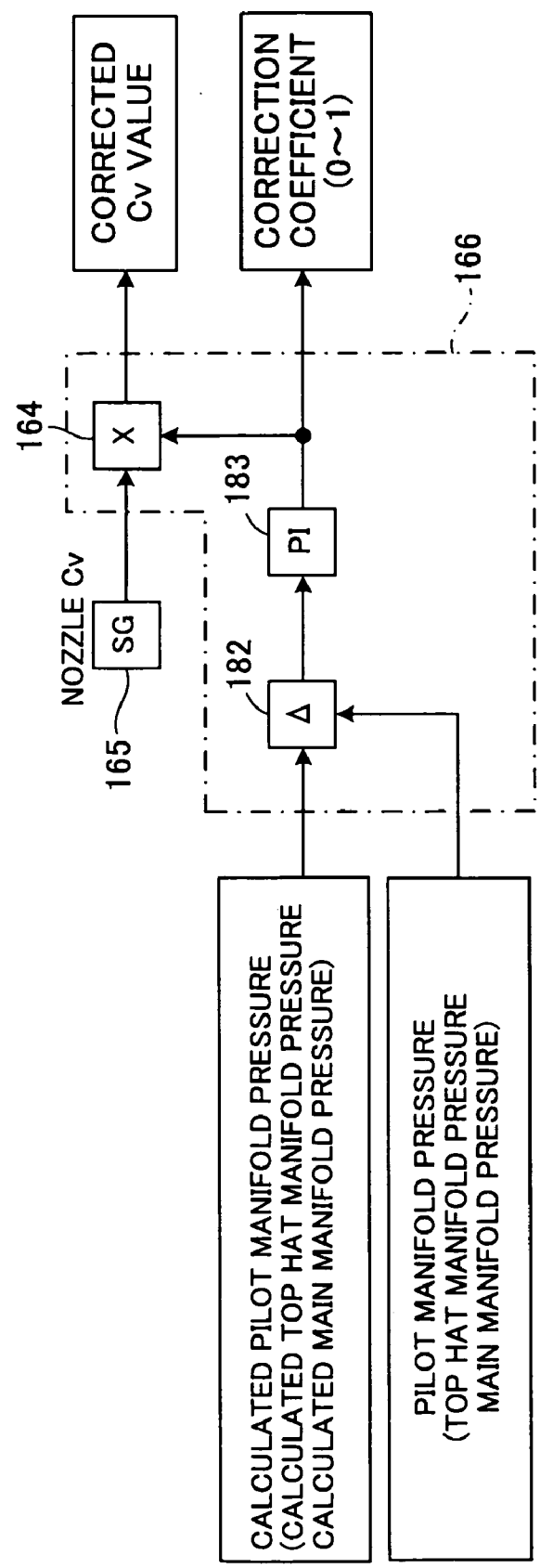
FIG. 33 is a logic diagram showing a configuration of a learning circuit for a nozzle Cv value in the combustion control device for a gas turbine.

Next, the learning circuit 166 will be described with reference to FIG. 33. As similar to the case of the learning circuit 62, the learning circuit 166 firstly judges whether or not the combustion gas temperature TIT reaches the maximum combustion gas temperature (1500° C.) before starting to learn the nozzle Cv value. Specifically, when the combustion gas temperature TIT is equal to the maximum combustion gas temperature (1500° C.), there is the relation between the pressure ratio of the compressor 4 (the ratio between the pressure on the inlet side and the pressure on the outlet side of the compressor 4) and the exhaust gas temperature as shown in FIG. 18. Therefore, the learning circuit 166 monitors the pressure ratio (the cylinder pressure/the intake-air pressure) of the compressor 4 obtained from the actual measurement value of the intake-air pressure and the actual measurement value of the cylinder pressure as well as the actual measurement value of the exhaust gas temperature. Moreover, the learning circuit 62 judges that the combustion gas temperature TIT at the inlet of the gas turbine reaches the maximum combustion gas temperature (1500° C.) when the pressure ratio and the exhaust gas temperature satisfy the relation shown in FIG. 18, and then starts learning. It is to be noted, however, that the present invention will not be limited only to this configuration. For example, it is also possible to start learning before the combustion gas temperature TIT at the inlet of the gas turbine reaches the maximum combustion gas temperature (1500° C.).

When the learning circuit 166 starts learning, a subtracter (a deviation operator) 182 firstly calculates a deviation between the pilot manifold pressure (or any of the top hat manifold pressure and the main manifold pressure) $P_2$ calculated in accordance with the manifold pressure correction logic 163 and the pilot manifold pressure (or any of the top hat manifold pressure and the main manifold pressure) measured with the main manifold pressure gauge PX2 (or any of the top hat manifold pressure gauge PX3 and the main manifold pressure gauge PX1).

Thereafter, a PI controller 183 performs proportional and integral operations based on the deviation to calculate the correction coefficient in a range from 0 to 1. This correction efficient is outputted to the multiplier 164 of the manifold pressure correction logic 163 in FIG. 32 and is then multiplied by the nozzle Cv value (the fixed value) set in the signal generator 165. In this way, by correcting the nozzle Cv value so as to eliminate the deviation between the calculated value of the pilot manifold pressure (or any of the top hat manifold pressure and the main manifold pressure) $P_2$ and the actual measurement value of the pilot manifold pressure (or any of the top hat manifold pressure and the main manifold pressure). Accordingly it is possible to obtain a more accurate nozzle Cv value.

(Operation Effects)

As described above, according to the gas turbine combustion control device 41 of this embodiment, the 700° C. MW value and the 1500° C. MW value are calculated based on the IGV aperture, the intake-air temperature, and the atmospheric pressure ratio. Then, based on these values and on the actual measurement value of the power generator output (the gas turbine output), the CLCSO to render the combustion gas temperature at the inlet of the gas turbine dimensionless is computed by direct interpolation. Thereafter, the apertures of the pilot fuel flow rate control valve 19, the top hat fuel flow rate control valve 21, and the main fuel flow rate control valve 17 are controlled based on the respective fuel gas ratios (the pilot ratio, the top hat ratio, and the main ratio), which are determined based on this CLCSO. In this way, the fuel supplies to the respective fuel nozzles (the pilot nozzle 25, the top hat nozzle 27, and the main nozzle 26) are controlled. Accordingly, it is possible to perform the control based on the combustion gas temperature at the inlet of the gas turbine in conformity to the original concept, and to maintain the relations between the CLCSO and the respective fuel gas ratios (the pilot ratio, the top hat ratio, and the main ratio), i.e. the relations between the combustion gas temperature and the respective gas ratios (the pilot ratio, the top hat ratio, and the main ratio) even if the intake-air temperature, the combustion gas temperature, and the properties of the combustion gas are changed or if the performance of the gas turbine 1 is deteriorated. As a result, it is possible to perform more appropriate combustion control than a conventional combustion control device.

Moreover, according to the gas turbine combustion control device 41 of this embodiment, the bypass amount of the compressed air is controlled by regulating the aperture of the combustor bypass valve based on the computed CLCSO. Accordingly, it is possible to control the combustor bypass valve 8 based on the combustion gas temperature at the inlet of the gas turbine in conformity to the original concept as well. Moreover, it is possible to maintain the relation between the CLCSO and the aperture of the combustor bypass valve, i.e. the relation between the combustion gas temperature at the inlet of the gas turbine and the combustor bypass valve. As a result, it is possible to perform more appropriate combustion control than a conventional combustion control device in light of the bypass amount control of the compressed air as well.

Figure 34:
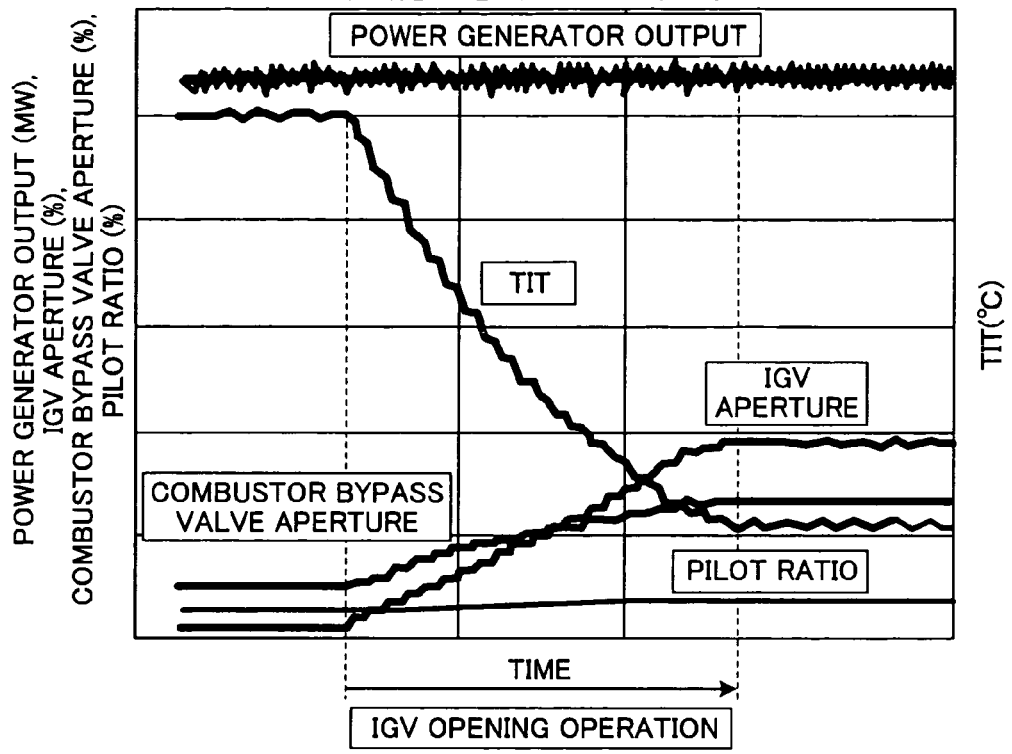
FIG. 34 is a graph showing operating results of the gas turbine including the combustion control device for a gas turbine.
Figure 35:
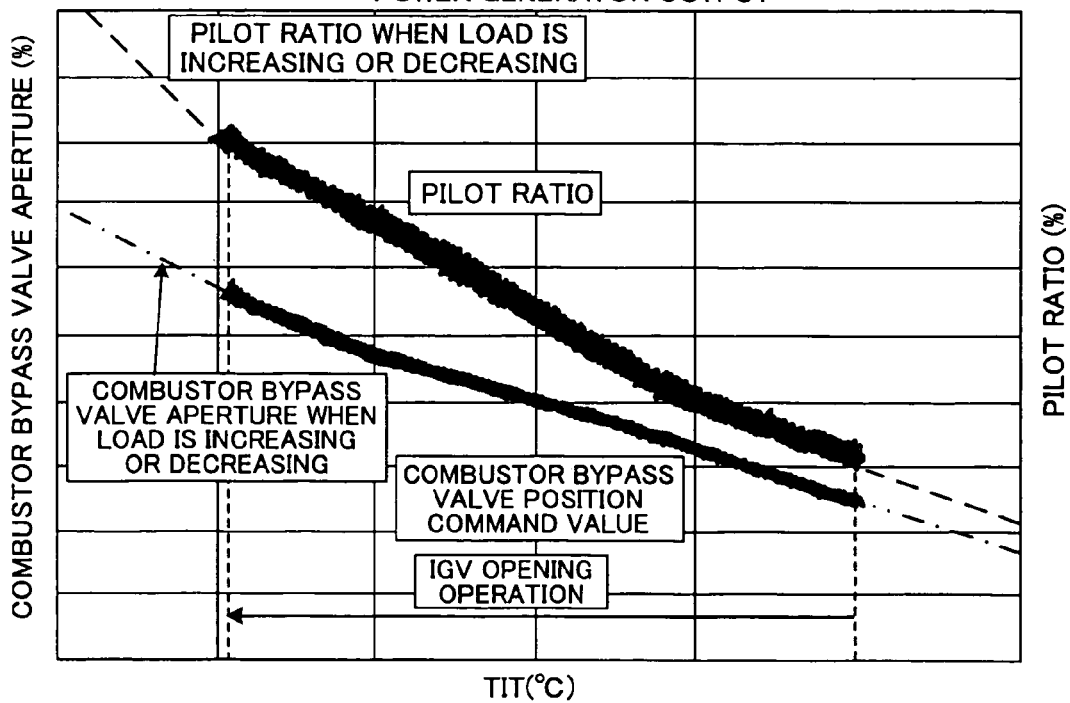
FIG. 35 is another graph showing operating results of the gas turbine including the combustion control device for a gas turbine.
Figure 36:
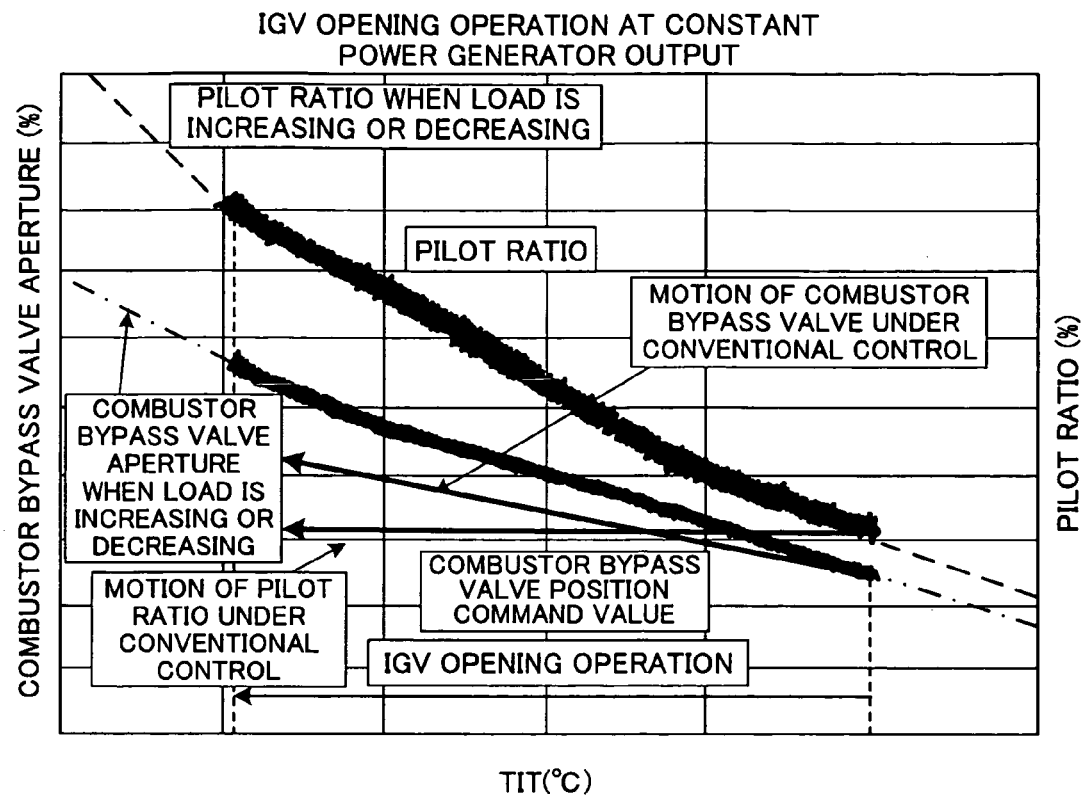
FIG. 36 is still another graph showing operating results of the gas turbine including the combustion control device for a gas turbine.
Figure 37:
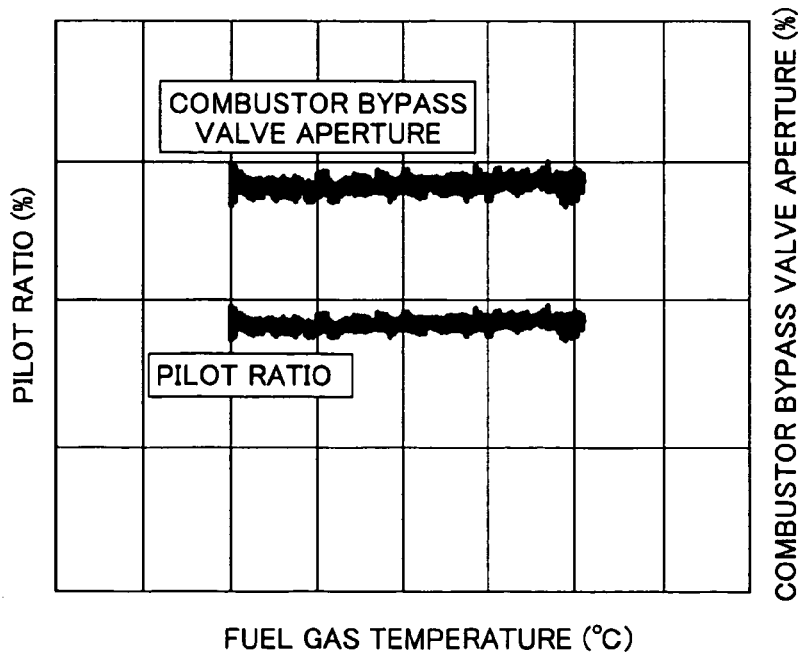
FIG. 37 is still another graph showing operating results of the gas turbine including the combustion control device for a gas turbine.
Figure 38:
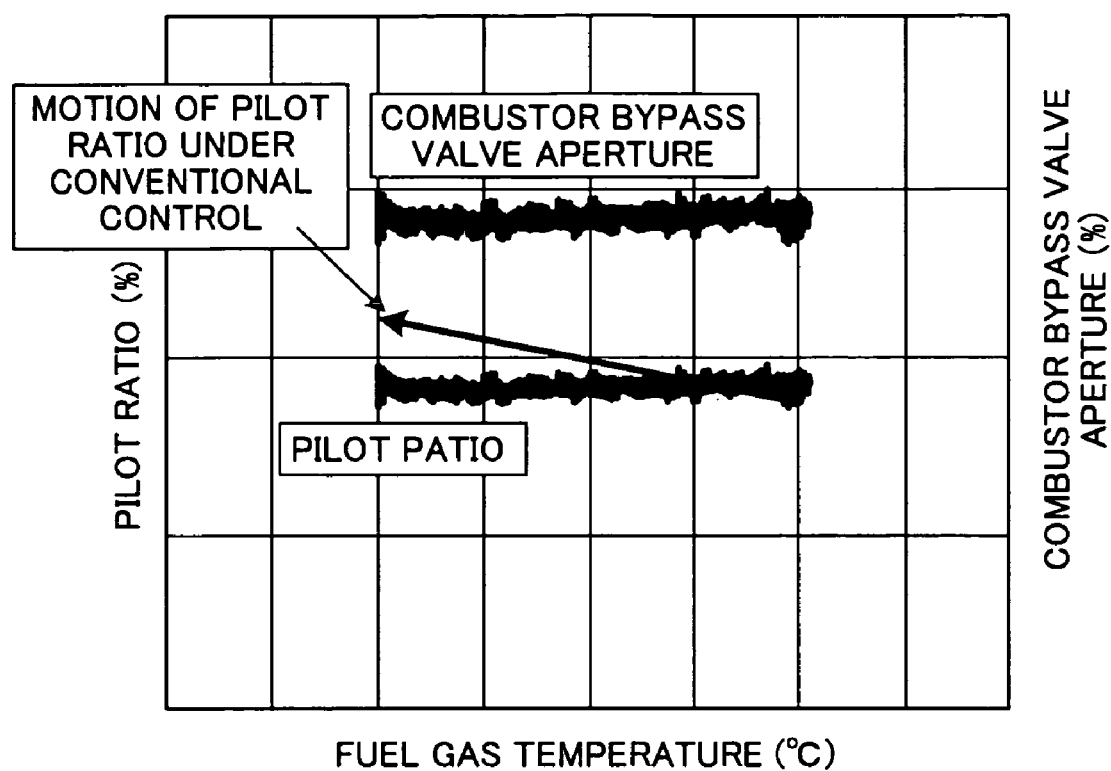
FIG. 38 is still another graph showing operating results of the gas turbine including the combustion control device for a gas turbine.
Figure 39:
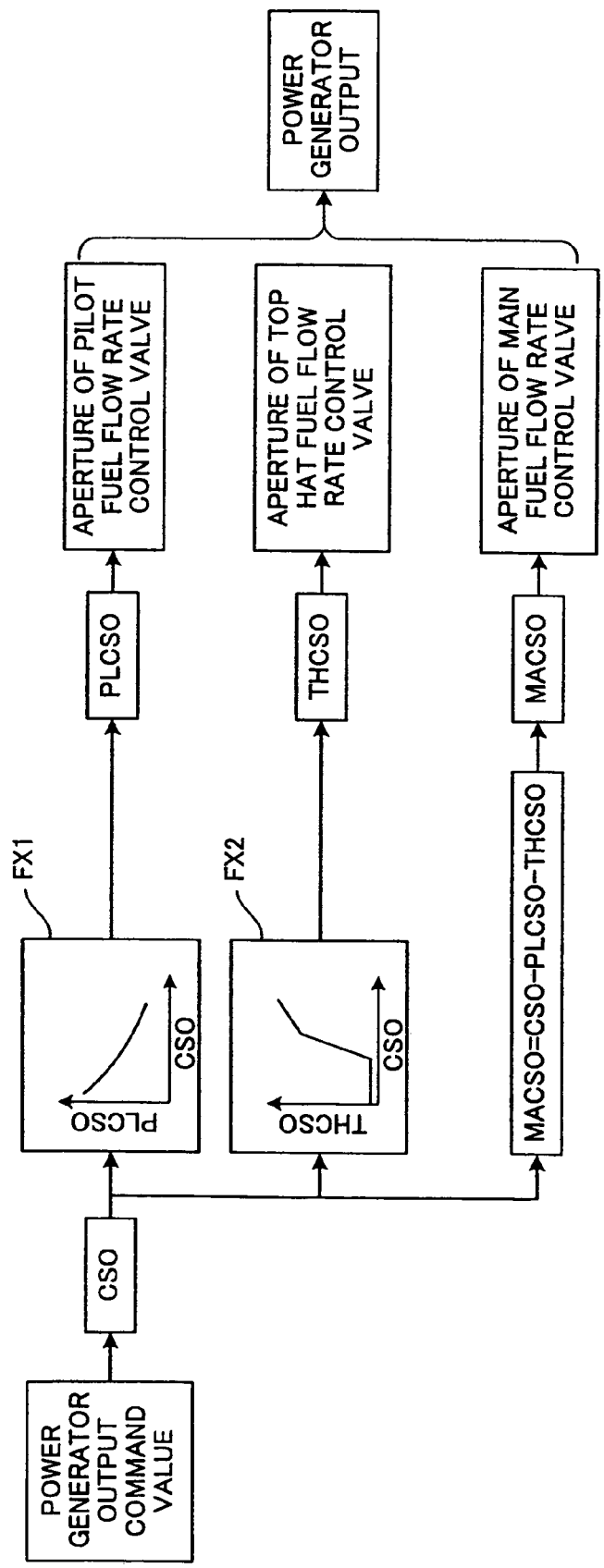
FIG. 39 is a block diagram showing an outline of a process flow in a conventional combustion control device for a gas turbine.
Figure 40:
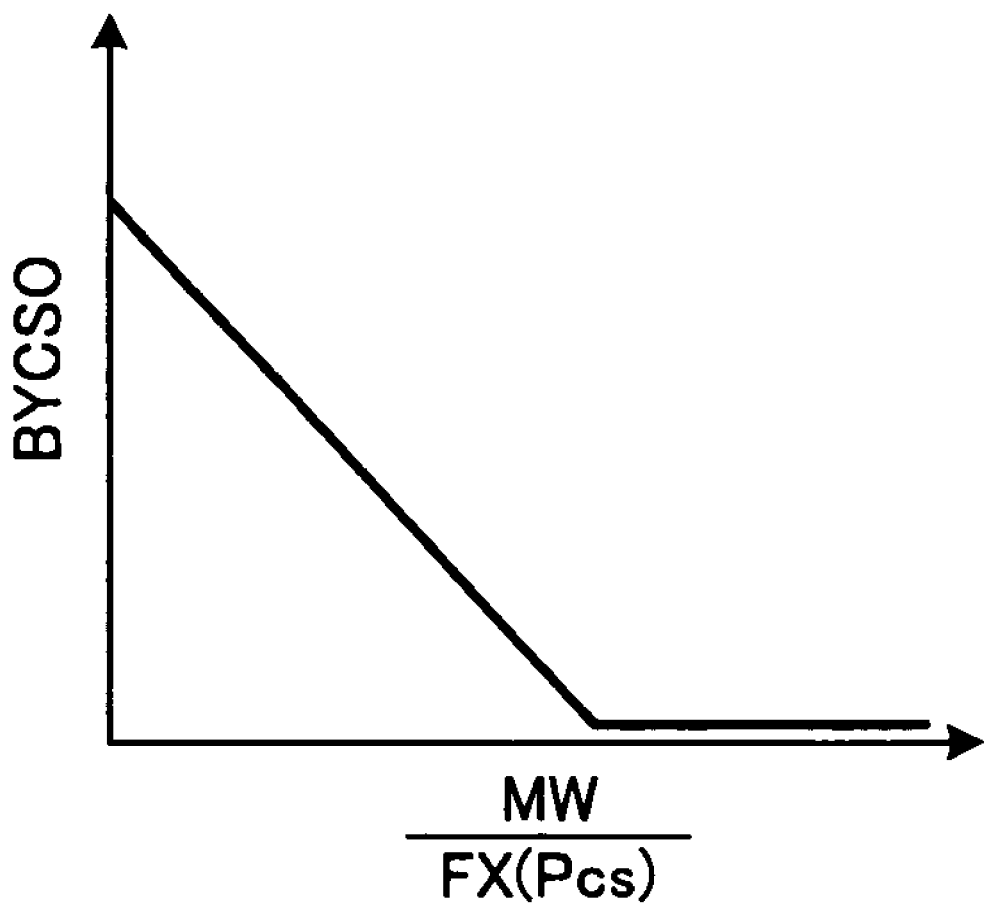
FIG. 40 is a graph showing a function of a ratio (MW/FX (Pcs)) between a power generator output (a gas turbine output) MW and a function FX(Pcs) of a cylinder pressure Pcs, and a BYCSO (a combustor bypass valve position command value).
Figure 41:
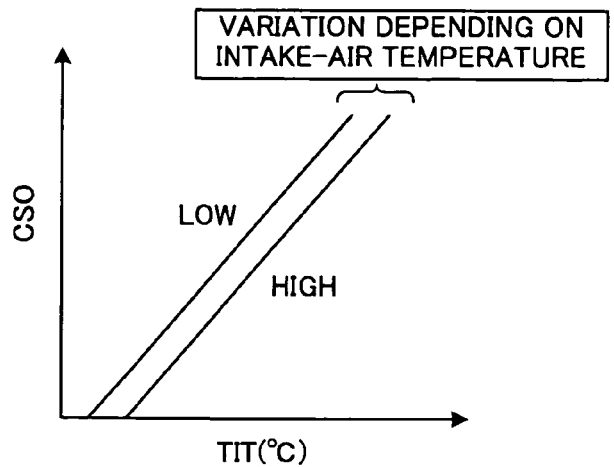
FIG. 41 is a graph showing a relation between a combustion gas temperature TIT at an inlet of a gas turbine and a CSO relative to a variation in an in-take air temperature.
Figure 42:
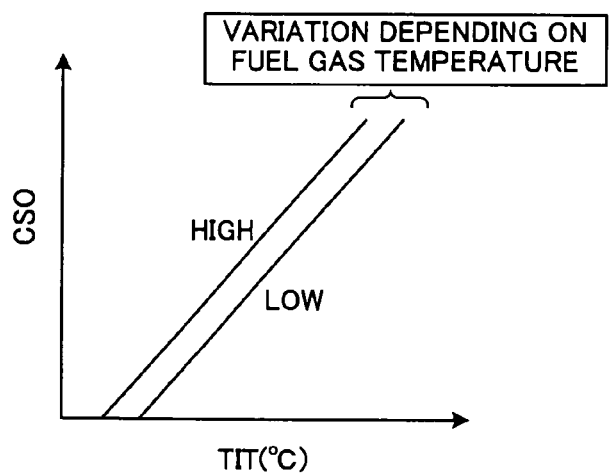
FIG. 42 is a graph showing a relation between the combustion gas temperature TIT at the inlet of the gas turbine and the CSO relative to a variation in a fuel gas temperature.
Figure 43:
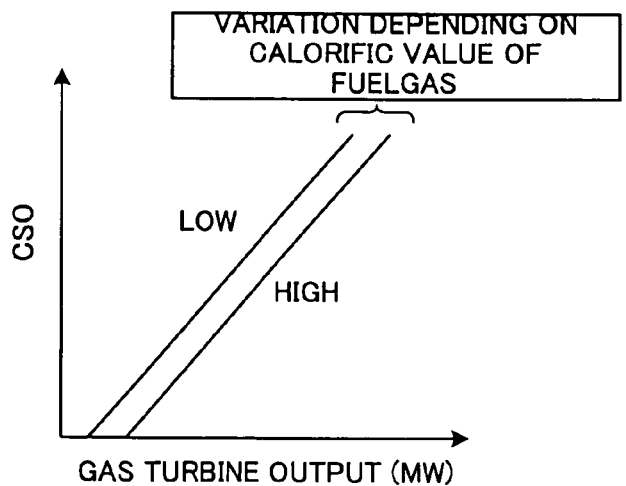
FIG. 43 is a graph showing a relation between the gas turbine output (the power generator output) and the CSO relative to a variation in a calorific value of the fuel gas.

For example, when carrying out an IGV opening operation at the constant power generator output (the gas turbine output), it is apparent from operating results of the gas turbine as shown in FIG. 34 to FIG. 36 that the pilot ratio and the aperture of the combustor bypass valve follow a decline in the combustion gas temperature TIT at the inlet of the gas turbine attributable to the IGV opening operation. Moreover, it is also apparent from operating results of the gas turbine as shown in FIGS. 37 and 38 that a variation in the combustion gas temperature does not cause a variation in the pilot ratio or in the aperture of the combustor bypass valve.

Further, according to the gas turbine combustion control device 41 of this embodiment, the fuel gas ratios (the pilot ratio, the top hat ratio, and the main ratio) are corrected based on the intake-air temperature. Accordingly, it is possible to carry out more appropriate combustion control relative to a variation in the intake-air temperature. Moreover, the intake-air correction amount is adjusted in response to the CLCSO in this case. Therefore, it is possible to perform appropriate intake-air temperature correction in response to the load (the power generator output: the gas turbine output).

Meanwhile, the gas turbine combustion control device 41 of this embodiment includes the learning circuit 62 configured to compare the computed 1500° C. MW value with the actual measurement value of the power generator output (the gas turbine output) based on the actual measurement value of the exhaust gas temperature and the measurement after the judgment that the combustion gas temperature at the inlet of the gas turbine reaches the maximum temperature (1500° C.), and then to correct the 1500° C. MW value to coincide with the actual measurement value of the power generator output (the gas turbine output). Accordingly, even when the performance of the gas turbine 1 is deteriorated, it is possible to maintain the relations between the CLCSO (the combustion gas temperature at the inlet of the gas turbine) and the respective fuel gas ratios (the pilot ratio, the top hat ratio, and the main ratio) and the relation between the CLCSO (the combustion gas temperature at the inlet of the gas turbine) and the aperture of the combustor bypass valve.

Furthermore, according to the gas turbine combustion control device 41 of this embodiment, the fuel flow rate command values (the PLCSO, the THCSO, and the MACSO) for the respective types of the fuel gas are calculated based on the total fuel flow rate command value (the CSO) and the fuel gas ratios (the pilot ratio, the top hat ratio, and the main ratio). Then, the fuel gas flow rates (the pilot fuel gas flow rate $G_{fPL}$, the top hat fuel gas flow rate $G_{fTH}$, and the main fuel gas flow rate $G_{fMA}$) are calculated based on the function of the fuel flow rate command value and the fuel gas flow rate. Thereafter, the Cv values of the respective fuel flow rate control valves 17, 19, and 21 are calculated in accordance with the Cv value calculation formula based on the fuel gas flow rates, the fuel gas temperature, and the front and back pressures of the respective fuel flow rate control valves 17, 19, and 21. Then, the respective fuel flow rate control valve position command values (the pilot fuel flow rate control valve position command value, the top hat fuel flow rate control valve position command value, and the main fuel flow rate control valve position command value) are calculated based on the Cv values and on the function between the Cv value and the aperture of the fuel flow rate control valve. Accordingly, it is possible to automatically determine the apertures of the respective fuel flow rate control valves 17, 19, and 21 so as to meet the predetermined fuel gas ratios (the pilot ratio, the top hat ratio, and the main ratio). That is, as long as the fuel gas ratios (the pilot ratio, the top hat ratio, and the main ratio) are inputted, it is possible to calculate the respective fuel flow rate control valve position command values (the pilot fuel flow rate control valve position command value, the top hat fuel flow rate control valve position command value, and the main fuel flow rate control valve position command value) corresponding to the fuel gas ratios automatically.

Meanwhile, according to the gas turbine combustion control device 41 of this embodiment, when an anomaly occurs in the fuel gas thermometer Tf, the fuel gas temperature correction logic 120 applies the actual measurement value of the fuel gas temperature at a certain time period prior to occurrence of such an anomaly. Therefore, it is possible to perform stably combustion control and to continue operation of the gas turbine 1 without causing a rapid change in the combustion gas flow rate and the like even when the anomaly such as disconnection occurs in the fuel gas thermometer Tf.

Moreover, according to the gas turbine combustion control device 41 of this embodiment, the fuel gas temperature correction logic 120 includes the primary delay operator 124 and the primary delay operator 125 that has a smaller primary delay time constant than a primary delay constant of the primary delay operator 124. In terms of the fuel gas temperature, the primary delay operator 124 and the primary delay operator 125 perform primary delay operations, and a smaller value out of the results of such operations is used as the combustion gas temperature. Therefore, it is possible to relax a change a change rate of the combustion gas temperature at the inlet of the gas turbine and to prevent excessive infusion of the fuel gas.

Moreover, the gas turbine combustion control device 41 of this embodiment includes the manifold pressure computation logic 163 for computing the back pressures of the respective fuel flow rate control valves (the pilot fuel flow rate control valve 19, the top hat fuel flow rate control valve 21, and the main fuel flow rate control valve 17) corresponding to the front pressures of the respective fuel nozzles in accordance with the computational formula of the front pressures of the respective fuel nozzles derived from the Cv value computational formula of the respective fuel nozzles based on the fuel gas flow rates of the respective fuel nozzles (the pilot nozzle 25, the top hat nozzle 27, and the main nozzle 26) that are obtained from the respective fuel gas flow rates (the pilot fuel gas flow rate $G_{fPL}$, the top hat fuel gas flow rate $G_{fTH}$, and the main fuel gas flow rate $G_{fMA}$), the Cv values of the respective fuel nozzles, the fuel gas temperature, and the back pressures of the fuel nozzles. In addition, the gas turbine combustion control device 41 includes the manifold pressure correction logic 130, 140, and 150 for using the pressures computed with this manifold pressure computation logic 163 as the back pressures of the respective fuel flow rate control valves when an anomaly occurs in any of the respective pressure gauges (the pilot manifold pressure gauge PX2, the top hat manifold pressure gauge PX3, and the main manifold pressure gauge PX1) for measuring the back pressures of the respective fuel flow rate control valves. Therefore, even when an anomaly such as disconnection occurs in any of the pressure gauges (the pilot manifold pressure gauge PX2, the top hat manifold pressure gauge PX3, and the main manifold pressure gauge PX1), it is possible to perform combustion control of the gas turbine 1 and thereby to continue operation of the gas turbine 1.

Meanwhile, the gas turbine combustion control device 41 of this embodiment includes the learning circuit 166 for comparing the back pressures of the respective fuel flow rate control valves (the pilot fuel flow rate control valve 19, the top hat fuel flow rate control valve 21, and the main fuel flow rate control valve 17) computed by the manifold pressure computation logic 163 with the actual measurement values of the back pressures (the pilot manifold pressure, the top hat manifold pressure, and the main manifold pressure) of the respective fuel flow rate control valves and for correcting the Cv values of the respective fuel nozzles (the pilot nozzle 25, the top hat nozzle 27, and the main nozzle 26) such that the calculated values of the back pressures coincide with the actual measurement values of the back pressures. Therefore, it is possible to obtain more accurate Cv values and thereby to obtain the calculated values of the back pressures more accurately.

Here, the embodiment has been described as an example of the gas turbine including the combustor provided with three types of fuel nozzles, namely, a first fuel nozzle (corresponding to the main nozzle in the illustrated example), a second fuel nozzle (corresponding to the pilot nozzle in the illustrated example), and a third fuel nozzle (corresponding to the top hat nozzle in the illustrated example). However, the present invention will not be limited only to this configuration. For example, the present invention is also applicable to a gas turbine including a combustor provided with two types of fuel nozzles (the first fuel nozzle and the second fuel nozzle), and to a gas turbine including a combustor provided with four types of fuel nozzles (the first fuel nozzle, the second fuel nozzle, the third nozzle, and a fourth nozzle).

Moreover, the maximum fuel gas temperature is set to 1500° C. in the above-described embodiment. Needless to say, the maximum fuel gas temperature is not limited only to this level, and it is possible to set the maximum fuel gas temperature to any other levels such as 1400° C. or 1600° C., as appropriate, in the course of gas turbine designing processes in light of improvement in efficiency, durability of instruments, NOx reduction, and the like.

Further, when the valve position command values are set up based on the fuel ratios (the pilot ratio, the top hat ratio, and the main ratio) as described above, these fuel ratios are not necessarily determined based on the CLCSO. It is also possible to set up these fuel ratios based on other arbitrary means.

The present invention is applicable to and useful for the case of installing a combustion control device for a gas turbine which is fitted to a gas turbine provided with a gas turbine body, a combustor having multiple types of fuel nozzles, a compressor, and multiple fuel flow rate control valves for respectively controlling fuel supplies to the multiple types of the fuel nozzles, and is configured to control the fuel supplies to the multiple types of the fuel nozzles by controlling apertures of the fuel flow rate control valves.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion control device for a gas turbine which is fitted to a gas turbine provided with a gas turbine body, a combustor having multiple types of fuel nozzles, a compressor, and multiple fuel flow rate control valves for respectively controlling fuel supplies to the multiple types of the fuel nozzles, and which is configured to control the fuel supplies to the multiple types of the fuel nozzles by controlling apertures of the fuel flow rate control valves, the combustion control device comprising:

fuel flow rate command setting means for calculating fuel flow rate command values proportional to fuel flow rates to be supplied respectively to the multiple types of the fuel nozzles based on a total flow rate command value proportional to a total flow rate to be supplied to the multiple types of the fuel nozzles and on ratios of fuels to be supplied respectively to the multiple types of the fuel nozzles;

fuel flow rate setting means for calculating the fuel flow rates to be supplied respectively to the multiple types of the fuel nozzles based on the fuel flow rate command values set up by the fuel flow rate command setting means and based on a function of the fuel flow rate command values and the fuel flow rates;

Cv value setting means for calculating Cv values of the fuel flow rate control valves in accordance with a Cv value formula based on the fuel flow rates set up by the fuel flow rate setting means, a fuel temperature, and front pressures and back pressures of the fuel flow rate control valves; and fuel flow rate control valve position command setting means for calculating fuel flow rate control valve position command values based on the Cv values set up by the Cv value setting means and based on a function of the Cv values and fuel flow rate control valve positions, wherein the fuel supplies to the multiple types of the fuel nozzles are controlled by controlling apertures of the fuel flow rate control valves based on the fuel flow rate control valve position command values set up by the fuel flow rate control valve position command setting means.

2. The combustion control device for a gas turbine according to claim 1, further comprising:

intake-air temperature correcting means for correcting the ratios of the fuels based on an intake-air temperature.

3. The combustion control device for a gas turbine according to claim 2, wherein the intake-air temperature correcting means adjusts an amount of intake-air correction in response to a gas turbine output.

4. The combustion control device for a gas turbine according to claims 1, further comprising:
   fuel temperature correcting means for using a measurement value of the fuel temperature at a certain time period prior to occurrence of an anomaly of a fuel thermometer for measuring the fuel temperature as the fuel temperature in the event of the anomaly.

5. The combustion control device for a gas turbine according to claim 4,
   wherein the fuel temperature correcting means comprises a first primary delay operator and a second primary delay operator including a smaller primary delay time constant than a primary delay time constant of the first primary delay operator, and
   primary delay calculations are performed by use of the first primary delay operator and the second primary delay operator in terms of the fuel temperature, and a smaller value of calculation results is used as the fuel temperature.

6. The combustion control device for a gas turbine according to claim 1, further comprising:
   pressure computing means for computing a back pressure of the fuel flow rate control valves corresponding to a front pressure of the fuel nozzles by use of a formula for computation of the front pressure of the fuel nozzles based on the fuel flow rate of the fuel nozzles derived from the fuel flow rate set up by the fuel flow rate setting means, the Cv value of the fuel nozzles, the fuel temperature, and a back pressure of the fuel nozzles; and
   pressure correcting means for using the pressure computed by the pressure computing means as the back pressure of the fuel flow rate control valves upon occurrence of an anomaly of a pressure gauge for measuring the back pressure of the fuel flow rate control valves.

7. The combustion control device for a gas turbine according to claim 6, further comprising:
   learning means for comparing the back pressure of the fuel flow rate control valves computed by the pressure computing means with an actual measurement value of the back pressure of the fuel flow rate control valves and correcting the Cv value of the fuel nozzles such that the computed value of the back pressure coincides with the actual measurement value of the back pressure.

* * * * *